United States Patent
Zhang et al.

(10) Patent No.: US 11,653,371 B2
(45) Date of Patent: May 16, 2023

(54) TRANSMISSION CONFIGURATIONS FOR FULL DUPLEX TRANSMISSIONS

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 17/221,631

(22) Filed: Apr. 2, 2021

(65) Prior Publication Data
US 2021/0377949 A1 Dec. 2, 2021

Related U.S. Application Data

(60) Provisional application No. 63/032,230, filed on May 29, 2020.

(51) Int. Cl.
*H04W 72/04* (2009.01)
*H04L 5/14* (2006.01)
(Continued)

(52) U.S. Cl.
CPC ...... *H04W 72/0493* (2013.01); *H04B 7/0404* (2013.01); *H04B 7/0613* (2013.01);
(Continued)

(58) Field of Classification Search
CPC ........... H04W 72/0493; H04W 72/042; H04W 72/0453; H04W 72/1289; H04B 7/0404;
(Continued)

(56) References Cited

U.S. PATENT DOCUMENTS

2016/0330011 A1* 11/2016 Lee ........................ H04W 52/10
2019/0174472 A1* 6/2019 Lee ..................... H04W 72/044
(Continued)

FOREIGN PATENT DOCUMENTS

WO 2015094914 A1 6/2015
WO 2020006277 A1 1/2020

OTHER PUBLICATIONS

ETSI Technical Specification 138.214, version 15.3.0, Release 15, 3GPP, "3rd Generation Partnership Project, NR; Physical layer procedures for data," Oct. 2018, pp. 1-99.
(Continued)

*Primary Examiner* — Joshua Kading
(74) *Attorney, Agent, or Firm* — Arun Swain; Harrity & Harrity, LLP

(57) ABSTRACT

Various aspects of the present disclosure generally relate to wireless communication. In some aspects, a user equipment (UE) may receive, from a base station, downlink control information (DCI) associated with transmission configuration information, where the transmission configuration information includes a plurality of indicators of respective reference signals. The UE may communicate, with the base station, based at least in part on the transmission configuration information. The DCI may include a field associated with a transmission configuration indicator (TCI) state that includes the plurality of indicators. As an alternative, the DCI may include at least a first field associated with a first TCI state that includes a first indicator of the plurality of indicators and a second field associated with a second TCI state that includes a second indicator of the plurality of indicators. Numerous other aspects are described.

30 Claims, 13 Drawing Sheets

(51) Int. Cl.
*H04L 5/00* (2006.01)
*H04B 7/0404* (2017.01)
*H04B 7/06* (2006.01)
*H04B 7/08* (2006.01)
*H04L 1/02* (2006.01)
*H04W 72/0453* (2023.01)

(52) U.S. Cl.
CPC ......... *H04B 7/0617* (2013.01); *H04B 7/0682* (2013.01); *H04B 7/0691* (2013.01); *H04B 7/0874* (2013.01); *H04L 1/02* (2013.01); *H04L 5/0023* (2013.01); *H04L 5/0048* (2013.01); *H04L 5/14* (2013.01); *H04W 72/042* (2013.01); *H04W 72/0453* (2013.01)

(58) Field of Classification Search
CPC .... H04B 7/0613; H04B 7/0617; H04B 7/068; H04B 7/0682; H04B 7/0691; H04B 7/0874; H04L 1/02; H04L 1/06; H04L 5/0023; H04L 5/0048; H04L 5/14; H04L 5/1423
See application file for complete search history.

(56) References Cited

U.S. PATENT DOCUMENTS

| | | | |
|---|---|---|---|
| 2019/0261280 A1* | 8/2019 | Jung | H04W 52/386 |
| 2020/0112411 A1 | 4/2020 | Khoshnevisan et al. | |
| 2020/0235980 A1* | 7/2020 | John Wilson | H04L 5/143 |
| 2021/0152418 A1* | 5/2021 | Abdelghaffar | H04L 5/001 |
| 2021/0212032 A1* | 7/2021 | Lee | H04W 72/042 |

OTHER PUBLICATIONS

ETSI Technical Specification 138.331, version 15.7.0, Release 15, 3GPP, "3rd Generation Partnership Project, 5G; NR; Radio Resource Control (RRC); Protocol specification," Oct. 2019, pp. 1-523.
International Search Report and Written Opinion—PCT/US2021/025740—ISA/EPO—dated Jun. 21, 2021.
Zte, et al., "Details and Evaluation Results on Beam Indication", 3rd Generation Partnership Project (3GPP) Draft, 3GPP TSG RAN WG1 Meeting #91, R1-1719538, Reno, United States, dated Nov. 27, 2017, 11 Pages, retrieved from http://www.3gpp.org/ftp/tsg%5Fran/WG1%5FRL1/TSGR1%5F91/Docs/.

* cited by examiner

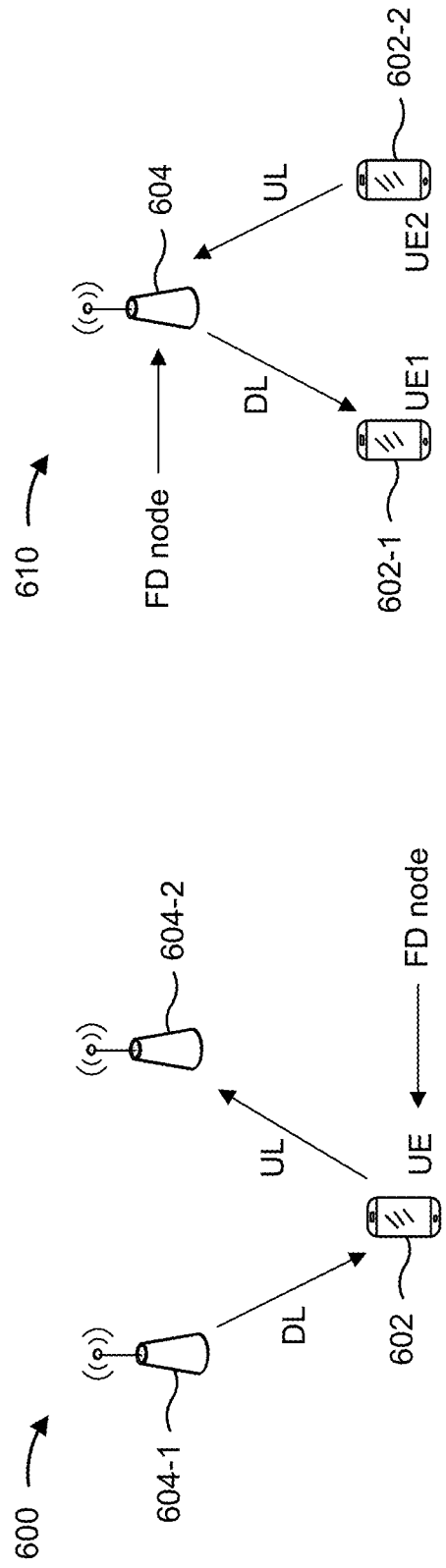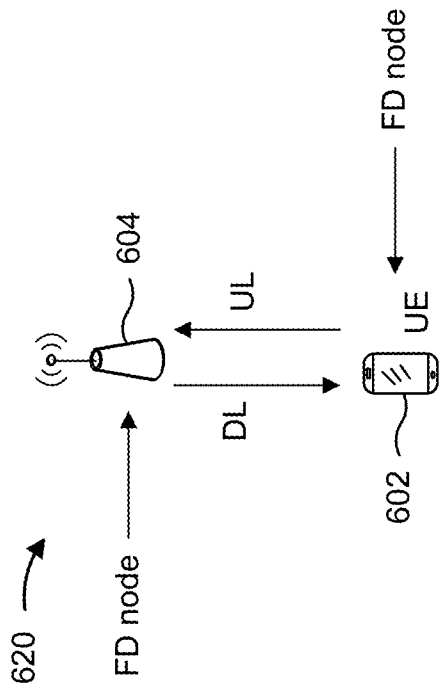
FIG. 6A
FIG. 6B
FIG. 6C

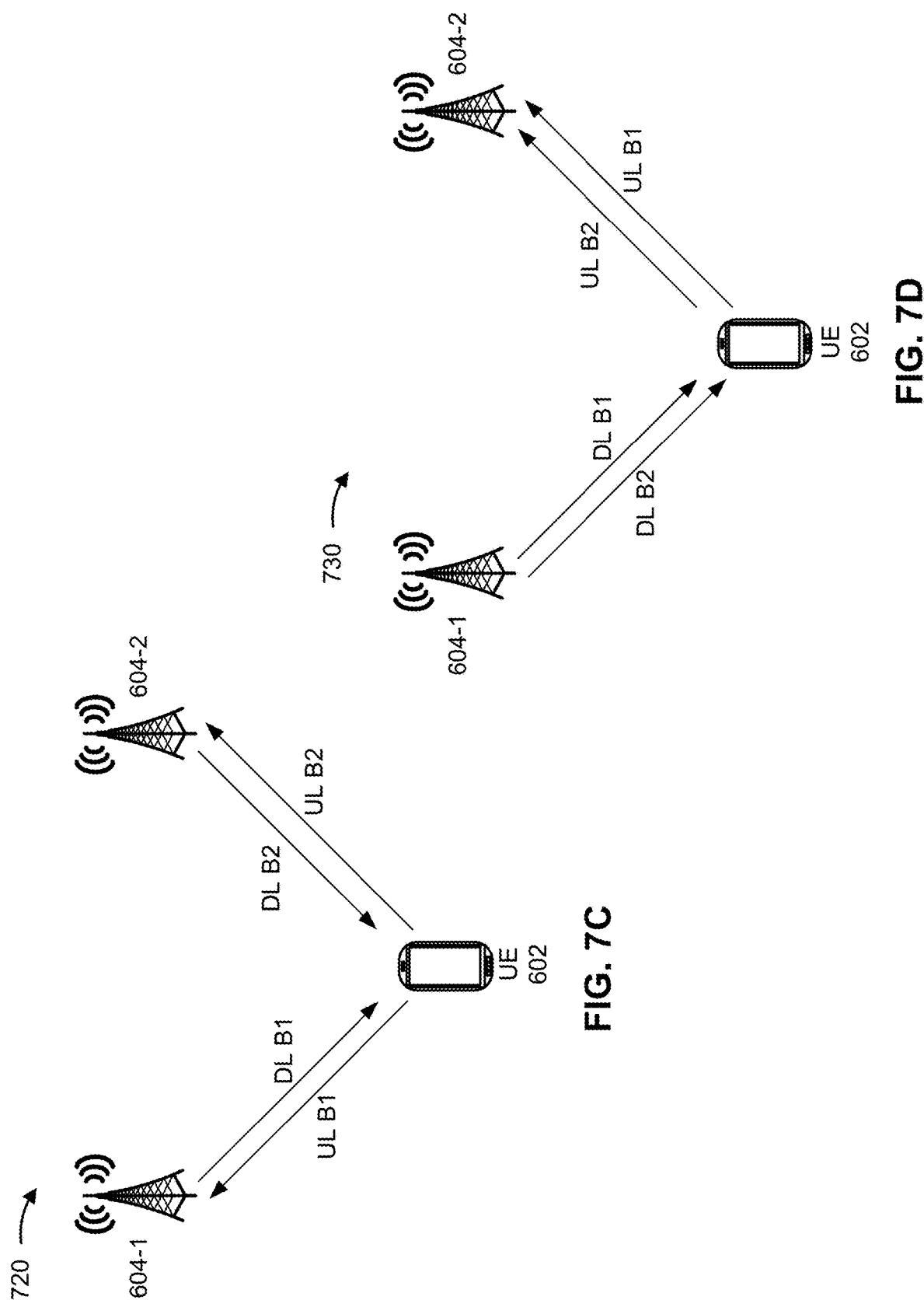

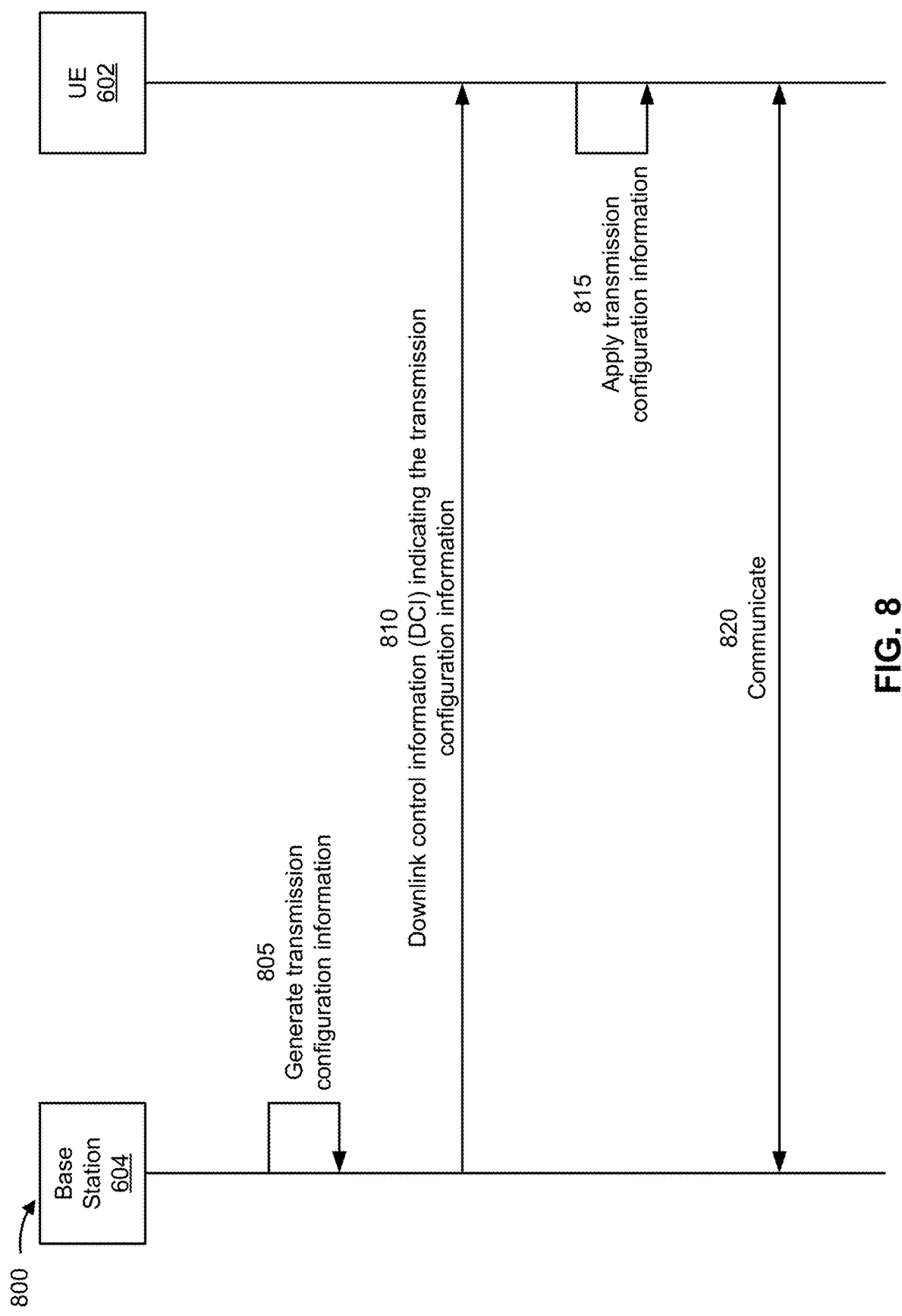

TRANSMISSION CONFIGURATIONS FOR FULL DUPLEX TRANSMISSIONS

CROSS-REFERENCE TO RELATED APPLICATION

This patent application claims priority to U.S. Provisional Patent Application No. 63/032,230, filed on May 29, 2020, entitled "TRANSMISSION CONFIGURATIONS FOR FULL DUPLEX TRANSMISSIONS," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for generating and transmitting transmission configurations for full duplex transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station, downlink control information (DCI) associated with transmission configuration information for full duplex transmissions, wherein the transmission configuration information includes a plurality of indicators of respective reference signals; and communicating, with the base station, based at least in part on the transmission configuration information.

In some aspects, a method of wireless communication, performed by a base station, may include generating transmission configuration information, for full duplex transmissions, that includes a plurality of indicators of respective reference signals; and transmitting, to a UE, DCI associated with the transmission configuration information.

In some aspects, a non-transitory computer-readable medium may store one or more instructions for wireless communication. The one or more instructions, when executed by one or more processors of a UE, may cause the UE to receive, from a base station, DCI associated with transmission configuration information for full duplex transmissions, wherein the transmission configuration information includes a plurality of indicators of respective reference signals; and communicate, with the base station, based at least in part on the transmission configuration information.

In some aspects, a non-transitory computer-readable medium may store one or more instructions for wireless communication. The one or more instructions, when executed by one or more processors of a base station, may cause the base station to generate transmission configuration information, for full duplex transmissions, that includes a plurality of indicators of respective reference signals; and transmit, to a UE, DCI associated with the transmission configuration information.

In some aspects, a UE for wireless communication may include a memory and one or more processors coupled to the memory. The memory and the one or more processors may be configured to receive, from a base station, DCI associated with transmission configuration information for full duplex transmissions, wherein the transmission configuration information includes a plurality of indicators of respective reference signals; and communicate, with the base station, based at least in part on the transmission configuration information.

In some aspects, a base station for wireless communication may include a memory and one or more processors coupled to the memory. The memory and the one or more processors may be configured to generate transmission configuration information, for full duplex transmissions, that includes a plurality of indicators of respective reference signals; and transmit, to a UE, DCI associated with the transmission configuration information.

In some aspects, an apparatus for wireless communication may include means for receiving, from a base station, DCI associated with transmission configuration information, wherein the transmission configuration information for full duplex transmissions includes a plurality of indicators of respective reference signals; and means for communicating, with the base station, based at least in part on the transmission configuration information.

In some aspects, an apparatus for wireless communication may include means for generating transmission configuration information, for full duplex transmissions, that includes a plurality of indicators of respective reference signals; and means for transmitting, to a UE, DCI associated with the transmission configuration information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A, 6B, and 6C are diagrams illustrating examples of full duplex communication, in accordance with the present disclosure.

FIGS. 7A, 7B, 7C, 7D, and 7E are diagrams illustrating examples of full duplex communication with multiple beams, in accordance with the present disclosure.

FIG. 8 is a diagram illustrating an example of generating and transmitting transmission configurations for full duplex transmissions, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
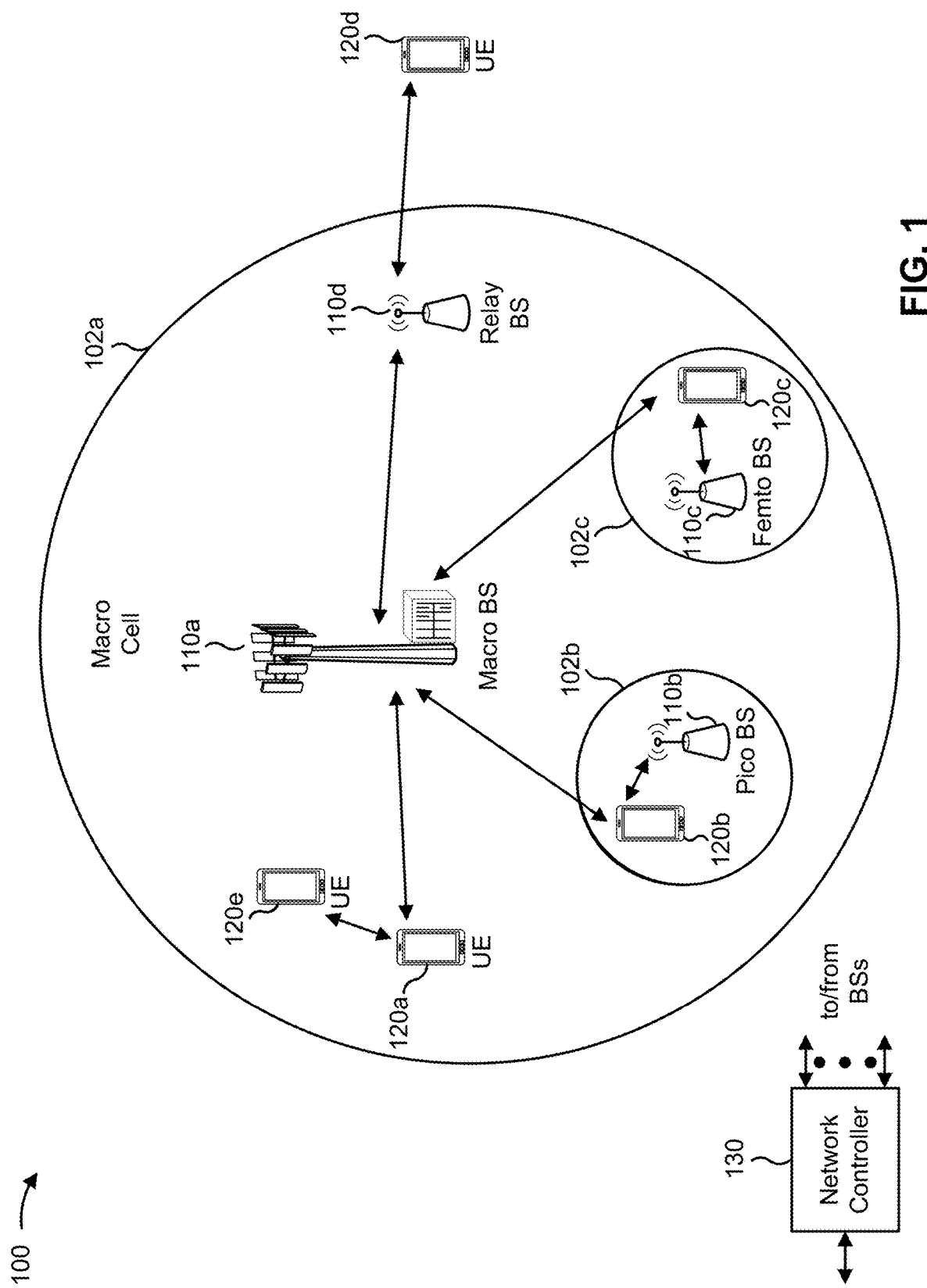
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
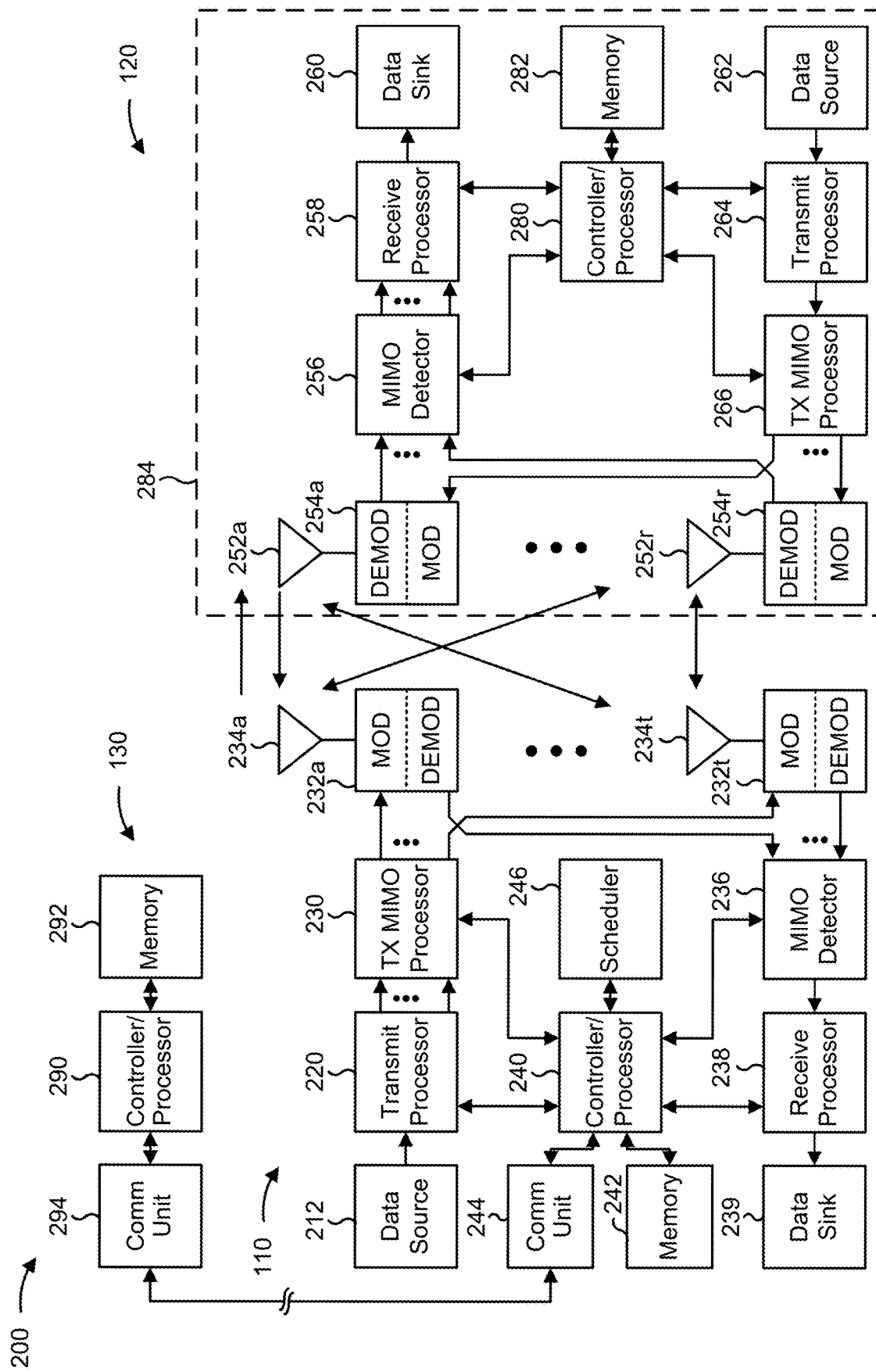
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 8-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 8-10).

Controller/processor 240 of base station 110, controller/processor 280 of UE 120, and/or any other component(s) of FIG. 2 may perform one or more techniques associated with generating and transmitting transmission configurations for full duplex transmissions, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a UE (e.g., the UE 120 and/or 602 604 as described below in connection with FIGS. 6A-8) may include means for receiving, from a base station (e.g., the base station 110 and/or base station 604 as described below in connection with FIGS. 6A-8), downlink control information (DCI) associated with transmission configuration information for full duplex transmissions, wherein the transmission configuration information includes a plurality of indicators of respective reference signals; and/or means for communicating, with the base station, based at least in part on the transmission configuration information. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282. In some aspects, the UE may further include means for determining the transmission configuration information from a downlink channel configuration associated with the DCI.

In some aspects, a base station (e.g., the base station 110 and/or base station 604 as described below in connection with FIGS. 6A-8) may include means for generating transmission configuration information, for full duplex transmissions, that includes a plurality of indicators of respective reference signals; and/or means for transmitting, to a UE (e.g., the UE 120 and/or 602 604 as described below in connection with FIGS. 6A-8), DCI associated with the transmission configuration information. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the base station may further include means for providing the transmission configuration information associated with the DCI on a downlink channel configuration. Additionally, or alternatively, the base station may include means for communicating, with the UE, based at least in part on the transmission configuration information, wherein the communicating includes transmitting a message or a sequence to the UE concurrent with receiving a message or a sequence from the UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
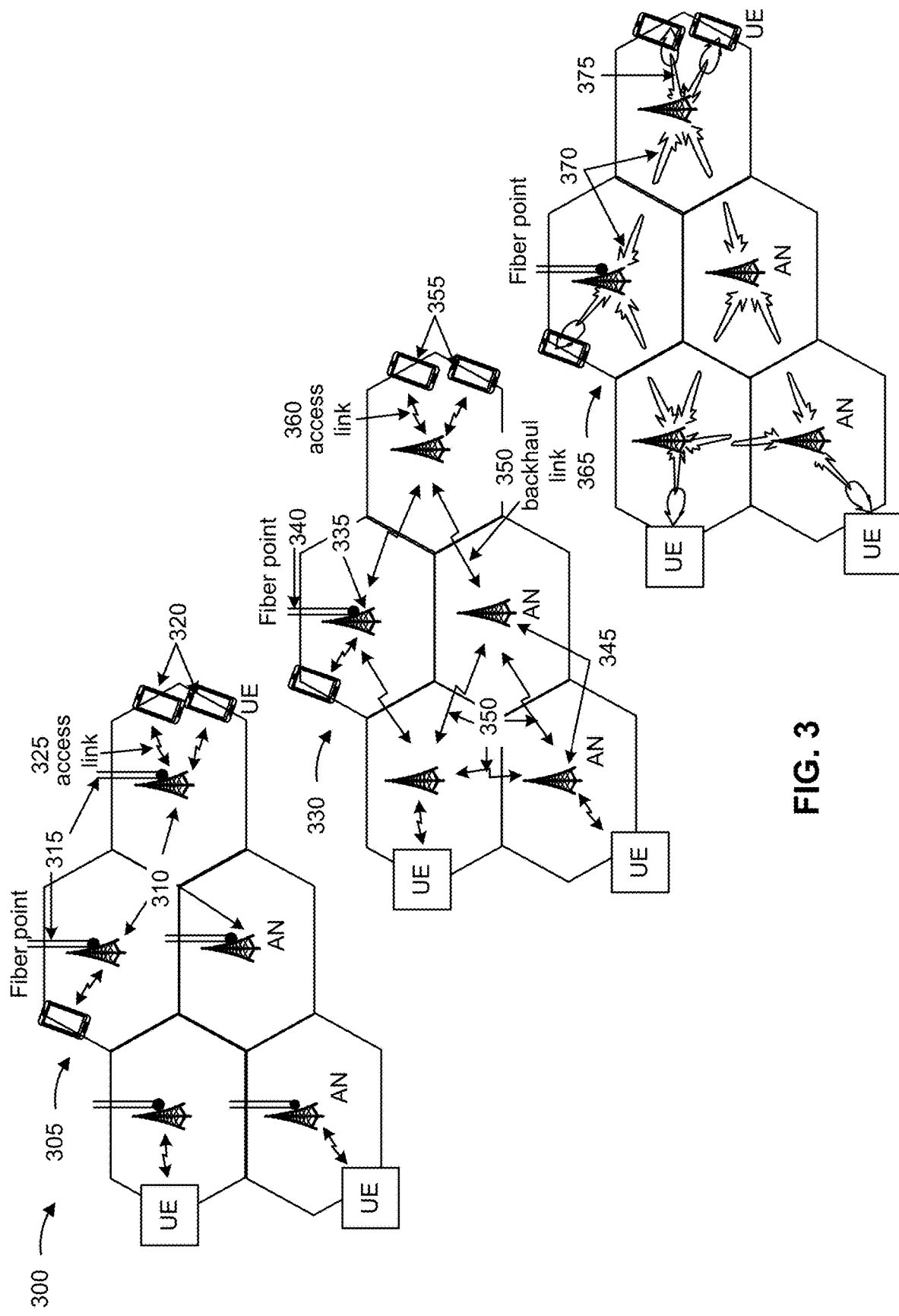
FIG. 3 is a diagram illustrating examples of radio access networks, in accordance with the present disclosure.

FIG. 3 is a diagram illustrating examples 300 of radio access networks, in accordance with the present disclosure. As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
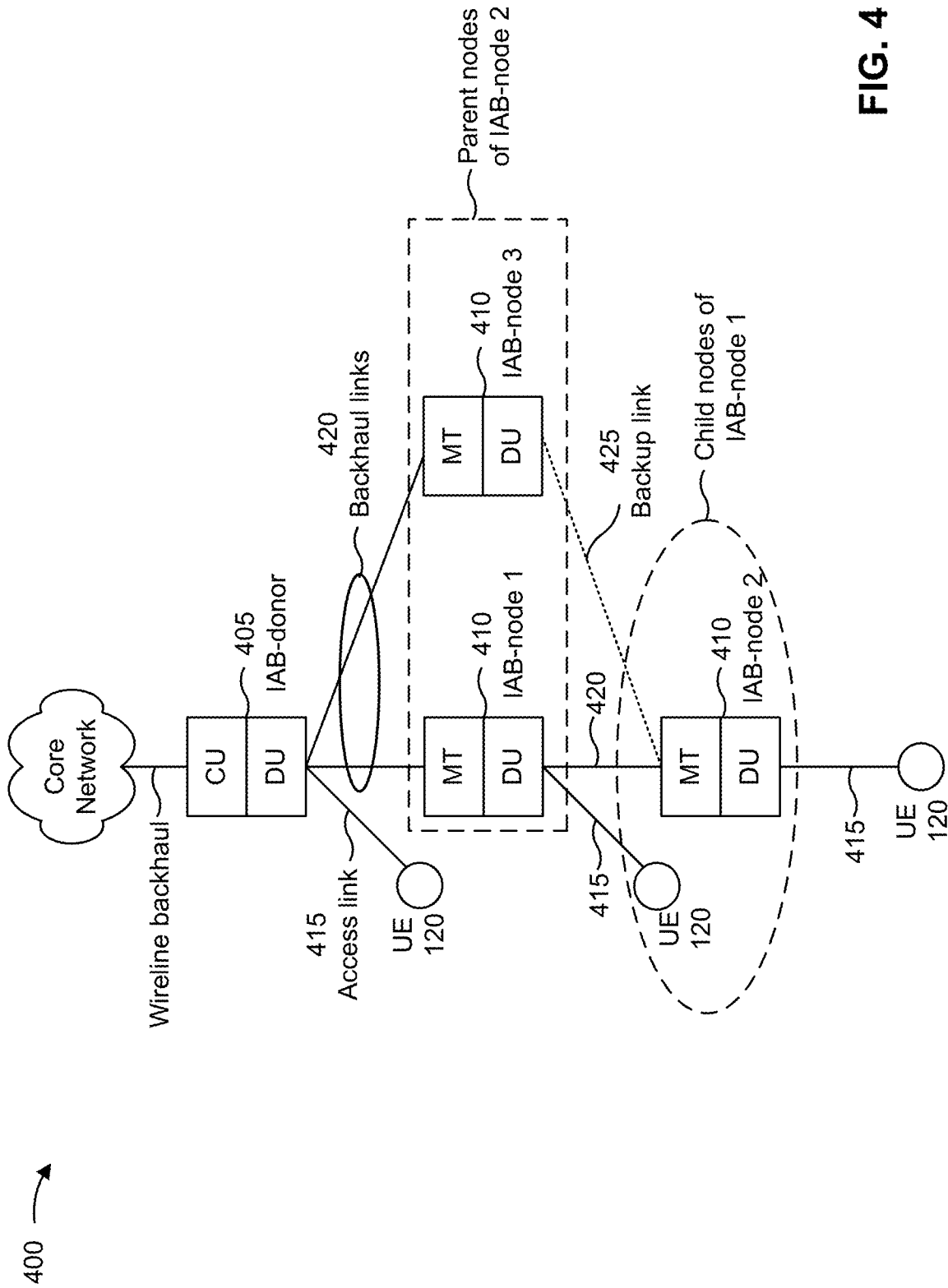
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure. As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a central unit (CU), which may perform access node controller (ANC) functions and/or AMF functions. The CU may configure a distributed unit (DU) of the IAB donor 405 and/or may configure one or more IAB nodes 410 (e.g., a mobile termination (MT) unit and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT unit may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

As indicated above, FIG. 4 is provided as an example. Other examples may differ from what is described with regard to FIG. 4.

Figure 5:
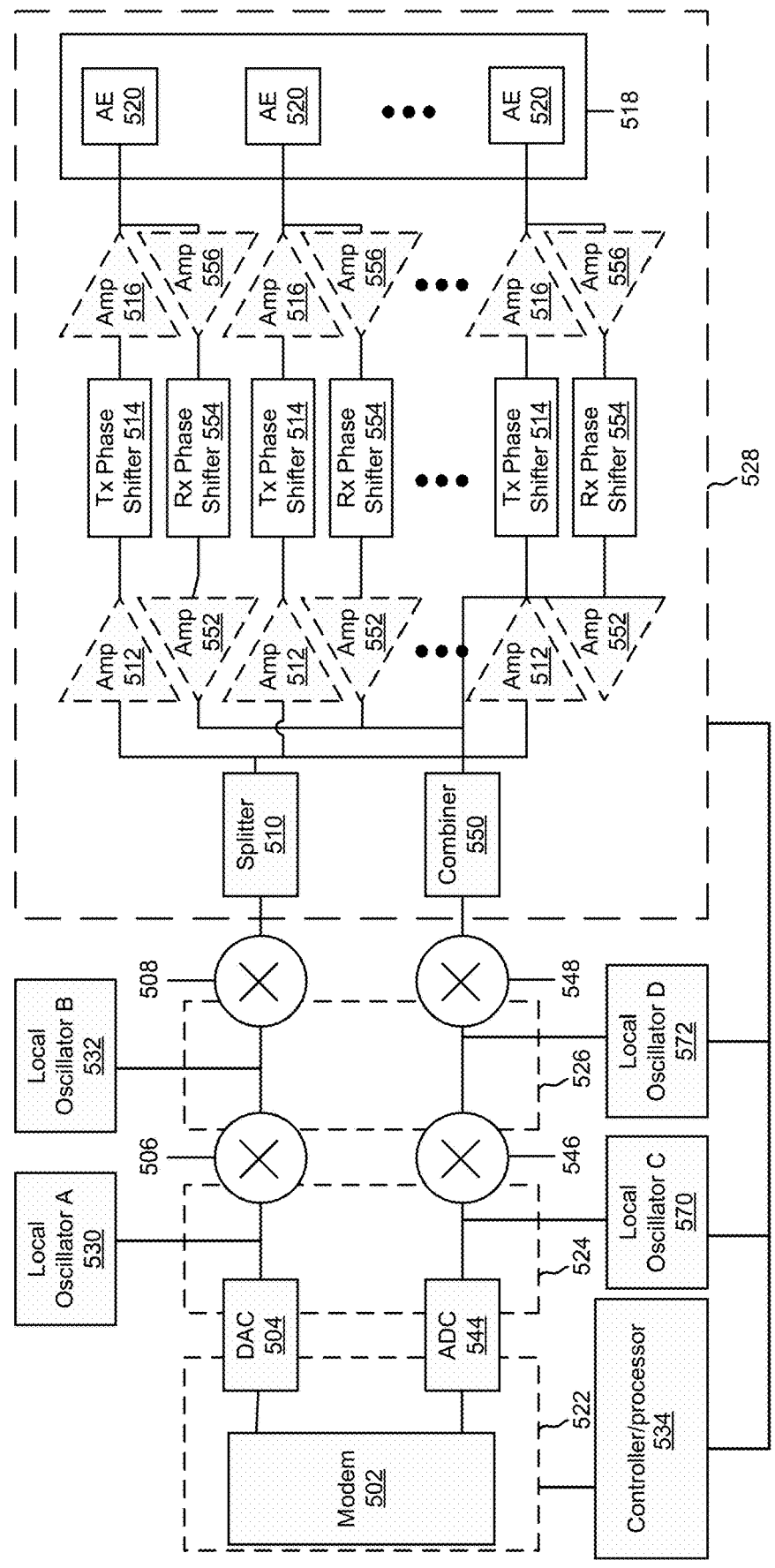
FIG. 5 is a diagram illustrating an example beamforming architecture that supports beamforming for millimeter wave (mmW) communications, in accordance with the present disclosure.
Figure 6D:
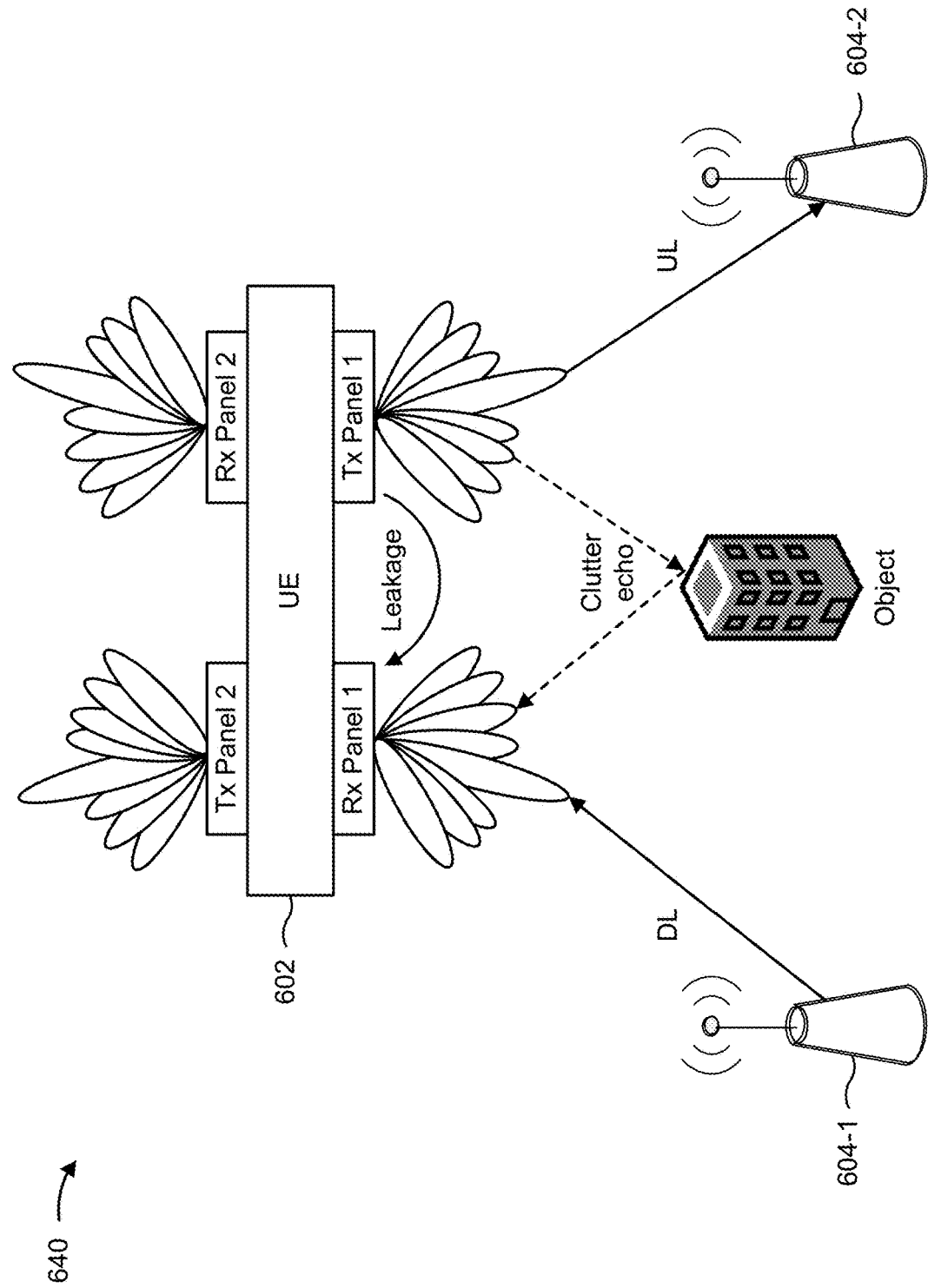
FIG. 6D is a diagram illustrating an example UE that supports full duplex communication and includes multiple antenna panels, in accordance with the present disclosure.

FIG. 5 is a diagram illustrating an example beamforming architecture 500 that supports beamforming for mmW communications, in accordance with the present disclosure. In some aspects, architecture 500 may implement aspects of wireless network 100. In some aspects, architecture 500 may be implemented in a transmitting device (e.g., a first wireless communication device, UE, or base station) and/or a receiving device (e.g., a second wireless communication device, UE, or base station), as described herein.

Broadly, FIG. 5 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 500 includes a modem (modulator/demodulator) 502, a digital to analog converter (DAC) 504, a first mixer 506, a second mixer 508, and a splitter 510. The architecture 500 also includes multiple first amplifiers 512, multiple phase shifters 514, multiple second amplifiers 516, and an antenna array 518 that includes multiple antenna elements 520.

Transmission lines or other waveguides, wires, and/or traces are shown connecting the various components to illustrate how signals to be transmitted may travel between components. Reference numbers 522, 524, 526, and 528 indicate regions in the architecture 500 in which different types of signals travel or are processed. Specifically, reference number 522 indicates a region in which digital baseband signals travel or are processed, reference number 524 indicates a region in which analog baseband signals travel or are processed, reference number 526 indicates a region in which analog intermediate frequency (IF) signals travel or are processed, and reference number 528 indicates a region in which analog radio frequency (RF) signals travel or are processed. The architecture also includes a local oscillator A 530, a local oscillator B 532, and a controller/processor 534. In some aspects, controller/processor 534 corresponds to controller/processor 240 of the base station described above in connection with FIG. 2 and/or controller/processor 280 of the UE described above in connection with FIG. 2.

Each of the antenna elements 520 may include one or more sub-elements for radiating or receiving RF signals. For example, a single antenna element 520 may include a first sub-element cross-polarized with a second sub-element that can be used to independently transmit cross-polarized signals. The antenna elements 520 may include patch antennas, dipole antennas, or other types of antennas arranged in a linear pattern, a two dimensional pattern, or another pattern. A spacing between antenna elements 520 may be such that signals with a desired wavelength transmitted separately by the antenna elements 520 may interact or interfere (e.g., to form a desired beam). For example, given an expected range of wavelengths or frequencies, the spacing may provide a quarter wavelength, half wavelength, or other fraction of a wavelength of spacing between neighboring antenna elements 520 to allow for interaction or interference of signals transmitted by the separate antenna elements 520 within that expected range.

The modem 502 processes and generates digital baseband signals and may also control operation of the DAC 504, first and second mixers 506 and 508, respectively, splitter 510, first amplifiers 512, phase shifters 514, and/or the second amplifiers 516 to transmit signals via one or more or all of the antenna elements 520. The modem 502 may process signals and control operation in accordance with a communication standard such as a wireless standard discussed herein. The DAC 504 may convert digital baseband signals received from the modem 502 (and that are to be transmitted) into analog baseband signals. The first mixer 506 upconverts analog baseband signals to analog IF signals within an IF using a local oscillator A 530. For example, the first mixer 506 may mix the signals with an oscillating signal generated by the local oscillator A 530 to "move" the baseband analog signals to the IF. In some cases, some processing or filtering (not shown) may take place at the IF. The second mixer 508 upconverts the analog IF signals to analog RF signals using the local oscillator B 532. Similar to the first mixer, the second mixer 508 may mix the signals with an oscillating signal generated by the local oscillator B 532 to "move" the IF analog signals to the RF or the frequency at which signals will be transmitted or received. The modem 502 and/or the controller/processor 534 may adjust the frequency of local oscillator A 530 and/or the local oscillator B 532 so that a desired IF and/or RF frequency is produced and used to facilitate processing and transmission of a signal within a desired bandwidth.

In the illustrated architecture 500, signals upconverted by the second mixer 508 are split or duplicated into multiple signals by the splitter 510. The splitter 510 in architecture 500 splits the RF signal into multiple identical or nearly identical RF signals. In other examples, the split may take place with any type of signal, including with baseband digital, baseband analog, or IF analog signals. Each of these signals may correspond to an antenna element 520, and the signal travels through and is processed by amplifiers 512 and 516, phase shifters 514, and/or other elements corresponding to the respective antenna element 520 to be provided to and transmitted by the corresponding antenna element 520 of the antenna array 518. In one example, the splitter 510 may be an active splitter that is connected to a power supply and provides some gain so that RF signals exiting the splitter 510 are at a power level equal to or greater than the signal entering the splitter 510. In another example, the splitter 510 is a passive splitter that is not connected to power supply and the RF signals exiting the splitter 510 may be at a power level lower than the RF signal entering the splitter 510.

After being split by the splitter 510, the resulting RF signals may enter an amplifier, such as a first amplifier 512, or a phase shifter 514 corresponding to an antenna element 520. The first and second amplifiers 512 and 516, respectively, are illustrated with dashed lines because one or both of them might not be necessary in some aspects. In some aspects, both the first amplifier 512 and second amplifier 516 are present. In some aspects, neither the first amplifier 512 nor the second amplifier 516 is present. In some aspects, one of the two amplifiers 512 and 516 is present but not the other. By way of example, if the splitter 510 is an active splitter, the first amplifier 512 may not be used. By way of further example, if the phase shifter 514 is an active phase shifter that can provide a gain, the second amplifier 516 might not be used.

The amplifiers 512 and 516 may provide a desired level of positive or negative gain. A positive gain (positive dB) may be used to increase an amplitude of a signal for radiation by a specific antenna element 520. A negative gain (negative dB) may be used to decrease an amplitude and/or suppress radiation of the signal by a specific antenna element. Each of the amplifiers 512 and 516 may be controlled independently (e.g., by the modem 502 or the controller/processor 534) to provide independent control of the gain for each antenna element 520. For example, the modem 502 and/or the controller/processor 534 may have at least one control line connected to each of the splitter 510, first amplifiers 512, phase shifters 514, and/or second amplifiers 516 that may be used to configure a gain to provide a desired amount of gain for each component and thus each antenna element 520.

The phase shifter 514 may provide a configurable phase shift or phase offset to a corresponding RF signal to be transmitted. The phase shifter 514 may be a passive phase shifter not directly connected to a power supply. Passive phase shifters might introduce some insertion loss. The second amplifier 516 may boost the signal to compensate for the insertion loss. The phase shifter 514 may be an active phase shifter connected to a power supply such that the active phase shifter provides some amount of gain or prevents insertion loss. The settings of each of the phase shifters 514 are independent, meaning that each can be independently set to provide a desired amount of phase shift or the same amount of phase shift or some other configuration. The modem 502 and/or the controller/processor 534 may have at least one control line connected to each of the phase shifters 514 and which may be used to configure the phase shifters 514 to provide a desired amount of phase shift or phase offset between antenna elements 520.

In the illustrated architecture 500, RF signals received by the antenna elements 520 are provided to one or more first amplifiers 556 to boost the signal strength. The first amplifiers 556 may be connected to the same antenna arrays 518 (e.g., for time division duplex (TDD) operations). The first amplifiers 556 may be connected to different antenna arrays 518. The boosted RF signal is input into one or more phase shifters 554 to provide a configurable phase shift or phase offset for the corresponding received RF signal to enable reception via one or more Rx beams. The phase shifter 554 may be an active phase shifter or a passive phase shifter. The settings of the phase shifters 554 are independent, meaning that each can be independently set to provide a desired amount of phase shift or the same amount of phase shift or some other configuration. The modem 502 and/or the controller/processor 534 may have at least one control line connected to each of the phase shifters 554 and which may be used to configure the phase shifters 554 to provide a desired amount of phase shift or phase offset between antenna elements 520 to enable reception via one or more Rx beams.

The outputs of the phase shifters 554 may be input to one or more second amplifiers 552 for signal amplification of the phase shifted received RF signals. The second amplifiers 552 may be individually configured to provide a configured amount of gain. The second amplifiers 552 may be individually configured to provide an amount of gain to ensure that the signals input to combiner 550 have the same magnitude. The amplifiers 552 and/or 556 are illustrated in dashed lines because they might not be necessary in some aspects. In some aspects, both the amplifier 552 and the amplifier 556 are present. In another aspect, neither the amplifier 552 nor the amplifier 556 are present. In other aspects, one of the amplifiers 552 and 556 is present but not the other.

In the illustrated architecture 500, signals output by the phase shifters 554 (via the amplifiers 552 when present) are combined in combiner 550. The combiner 550 in architecture 500 combines the RF signal into a signal. The combiner 550 may be a passive combiner (e.g., not connected to a power source), which may result in some insertion loss. The combiner 550 may be an active combiner (e.g., connected to a power source), which may result in some signal gain. When combiner 550 is an active combiner, it may provide a different (e.g., configurable) amount of gain for each input signal so that the input signals have the same magnitude when they are combined. When combiner 550 is an active combiner, the combiner 550 may not need the second amplifier 552 because the active combiner may provide the signal amplification.

The output of the combiner 550 is input into mixers 548 and 546. Mixers 548 and 546 generally down convert the received RF signal using inputs from local oscillators 572 and 570, respectively, to create intermediate or baseband signals that carry the encoded and modulated information. The output of the mixers 548 and 546 are input into an analog-to-digital converter (ADC) 544 for conversion to analog signals. The analog signals output from ADC 544 are input to modem 502 for baseband processing, such as decoding, de-interleaving, or similar operations.

The architecture 500 is given by way of example only to illustrate an architecture for transmitting and/or receiving signals. In some cases, the architecture 500 and/or each portion of the architecture 500 may be repeated multiple times within an architecture to accommodate or provide an arbitrary number of RF chains, antenna elements, and/or antenna panels. Furthermore, numerous alternate architectures are possible and contemplated. For example, although only a single antenna array 518 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 522, 524, 526, and 528) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 510, amplifiers 512 and 516, or phase shifters 514 may be located between the DAC 504 and the first mixer 506 or between the first mixer 506 and the second mixer 508. In one example, the functions of one or more of the components may be combined into one component. For example, the phase shifters 514 may perform amplification to include or replace the first amplifier 512 and/or second amplifier 516. By way of another example, a phase shift may be implemented by the second mixer 508 to obviate the need for a separate phase shifter 514. This technique is sometimes called local oscillator (LO) phase shifting. In some aspects of this configuration, there may be multiple IF to RF mixers (e.g., for each antenna element chain) within the second mixer 508, and the local oscillator B 532 may supply different local oscillator signals (with different phase offsets) to each IF to RF mixer.

The modem 502 and/or the controller/processor 534 may control one or more of the other components 504 through 572 to select one or more antenna elements 520 and/or to form beams for transmission of one or more signals. For example, the antenna elements 520 may be individually selected or deselected for transmission of a signal (or signals) by controlling an amplitude of one or more corresponding amplifiers, such as the first amplifiers 512 and/or the second amplifiers 516. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 520, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 518) can be dynamically controlled by modifying the phase shifts or phase offsets imparted by the phase shifters 514 and amplitudes imparted by the amplifiers 512 and 516 of the multiple signals relative to each other. The controller/processor 534 may be located partially or fully within one or more other components of the architecture 500. For example, the controller/processor 534 may be located within the modem 502 in some aspects.

As indicated above, FIG. 5 is provided as an example. Other examples may differ from what is described with regard to FIG. 5.

FIGS. 6A, 6B, and 6C are diagrams illustrating examples 600, 610, and 620, respectively, of full duplex (FD) communication. As shown in FIGS. 6A-6C, examples 600, 610, and 620 each include one or more UEs 602 in communication with one or more base stations (or TRPs) 604 in a wireless network that supports full duplex communication. However, it will be appreciated that the devices shown in FIGS. 6A-6C are exemplary only, and that the wireless network may support full duplex communication between other devices (e.g., between a UE and a base station or TRP, between a mobile termination node and a control node, between an IAB child node and an IAB parent node, and/or between a scheduled node and a scheduling node).

As shown in FIG. 6A, example 600 includes a UE 602 in communication with two base stations (or TRPs) 604-1 and 604-2. As shown in FIG. 6A, the UE 602 may transmit one or more uplink transmissions to base station 604-1 and may concurrently receive one or more downlink transmission from base station 604-2. Accordingly, in the example 600 shown in FIG. 6A, full duplex communication is enabled for the UE 602, which may be operating as a full duplex node, but not for the base stations 604-1 and 604-2, which may be operating as half duplex nodes. Additionally, or alternatively, as shown in FIG. 6B, example 610 includes two UEs, UE1 602-1 and UE2 602-2, in communication with a base station (or TRP) 604. In this case, the base station 604 may transmit one or more downlink transmissions to the UE1 602-1 and may concurrently receive one or more uplink transmissions from the UE2 602-2. Accordingly, in the example 610 shown in FIG. 6B, full duplex communication is enabled for the base station 604, which may be operating as a full duplex node, but not for the UE1 602-1 and the UE2 602-2, which may be operating as half duplex nodes. Additionally, or alternatively, as shown in FIG. 6C, example 620 includes a UE 602 in communication with a base station 604. In this case, the base station 604 may transmit, and the UE 602 may receive, one or more downlink transmissions concurrently with the UE 602 transmitting, and the base station 604 receiving, one or more uplink transmissions. Accordingly, in the example 620 shown in FIG. 6C, full duplex communication is enabled for both the UE 602 and the base station 604, each of which is operating as a full duplex node.

The present disclosure generally relates to improving a manner in which flexible TDD operates to support full duplex communication, which generally refers to simultaneous uplink and downlink transmissions. For example, full duplex communication may be used in communications on FR2 and/or in wireless networks that support beamformed communication (e.g., as described above in connection with FIG. 5). In some aspects, flexible TDD capabilities that support full duplex communication may be present at a scheduling node (e.g., a base station, a TRP, a control node, and/or an IAB parent node), a scheduled node (e.g., a UE, an MT node, and/or an IAB child node), or both. For example, a UE may use one antenna panel for uplink transmission and a different antenna panel for downlink reception. For example, as shown in example 640 of FIG. 6D, a UE 602 that supports full duplex communication may include multiple antenna panels (e.g., antenna arrays and/or other enclosures each including a plurality of antenna elements), and each antenna panel may be associated with one or more beam groups that can be used for uplink communication or for downlink communication. For example, in FIG. 6D, the UE 602 has four antenna panels that are associated with respective beam groups (e.g., panel 1 may be associated with beams that correspond to indices 1-8, panel 2 may be associated with beams that correspond to indices 9-16, panel 3 may be associated with beams that correspond to indices 17-24, and panel 4 may be associated with beams that correspond to indices 25-32). Furthermore, when full duplex communication is enabled at the UE 602, one or more antenna panels (e.g., panels 1 and 4) may be configured for uplink transmission to one or more TRPs and one or more antenna panels (e.g., panels 2 and 3) may be configured for downlink reception from one or more TRPs.

In general, full duplex communication may use beam separation between an uplink beam and a downlink beam at the respective antenna panels configured for transmission and reception, respectively. Accordingly, improving selection of the uplink beam and the downlink beam to reduce self-interference at the respective antenna panels improves the quality and/or reliability of full duplex communications. Additionally, using full duplex communication reduces latency by allowing a full duplex node to transmit or receive a downlink signal in an uplink-only slot and/or to transmit or receive an uplink signal in a downlink-only slot. Full duplex communication also can enhance spectral efficiency or throughput per cell and/or per UE by simultaneously utilizing time and frequency resources for uplink and downlink communication. However, the increased throughput and/or reduced latency in full duplex communication may be offset by reduced quality and/or reliability when the uplink beam and the downlink beam are selected such that higher self-interference results. Accordingly, if no uplink and downlink beam pair provide sufficient spatial separation, the UE and/or base station may be unable to operate in a full duplex transmission mode. For example, self-interference may occur when a transmitted signal leaks into a receive port (e.g., shown in FIG. 6D as leakage from panel 1 configured for uplink transmission into panel 2 configured for downlink reception). Additionally, or alternatively, self-interference may occur when an object reflects a transmitted signal back to a receive port (e.g., causing a clutter echo effect). For example, as shown in example 640 of FIG. 6D, a signal transmitted by antenna panel 1 toward node 604-2 may reflect off an object and into antenna panel 2, which causes interference with a downlink signal transmitted from node 604-1 toward antenna panel 2.

Accordingly, measuring self-interference at a wireless node that has full duplex capabilities improves selection of uplink and downlink beam pairs for full duplex communications. For example, a UE, an MT, and/or an IAB child node may obtain self-interference measurements to determine one or more candidate uplink transmit beams that can be paired with one or more candidate downlink receive beams. Additionally, or alternatively, a base station, a TRP, and/or an IAB parent node may obtain self-interference measurements to determine one or more candidate uplink receive beams that can be paired with one or more candidate downlink transmit beams. In general, to obtain the self-interference measurements, a wireless node with full duplex capabilities may transmit a signal from a first set of antennas in one or more transmit beam directions, and the wireless node may concurrently measure a received signal (e.g., a reflected or leaked transmit signal) on a second set of antennas in one or more receive beam directions. The first set of antennas may be different from or the same as the second set of antennas.

As indicated above, FIGS. 6A-6D are provided as one or more examples. Other examples may differ from what is described with regard to FIGS. 6A-6D.

FIGS. 7A, 7B, 7C, 7D, and 7E are diagrams illustrating examples 700, 710, 720, 730, and 740, respectively, of full duplex communication with multiple beams, in accordance with the present disclosure. As shown in FIGS. 7A-7E, examples 700, 710, 720, 730, and 740 each include one or more UEs 602 in communication with one or more base stations (or TRPs) 604 in a wireless network that supports full duplex communication using multiple beams. However, it will be appreciated that the devices shown in FIGS. 7A-7E are exemplary only, and that the wireless network may support full duplex communication between other devices (e.g., between a mobile termination node and a control node, between an IAB child node and an IAB parent node, and/or between a scheduled node and a scheduling node).

Figure 7B:
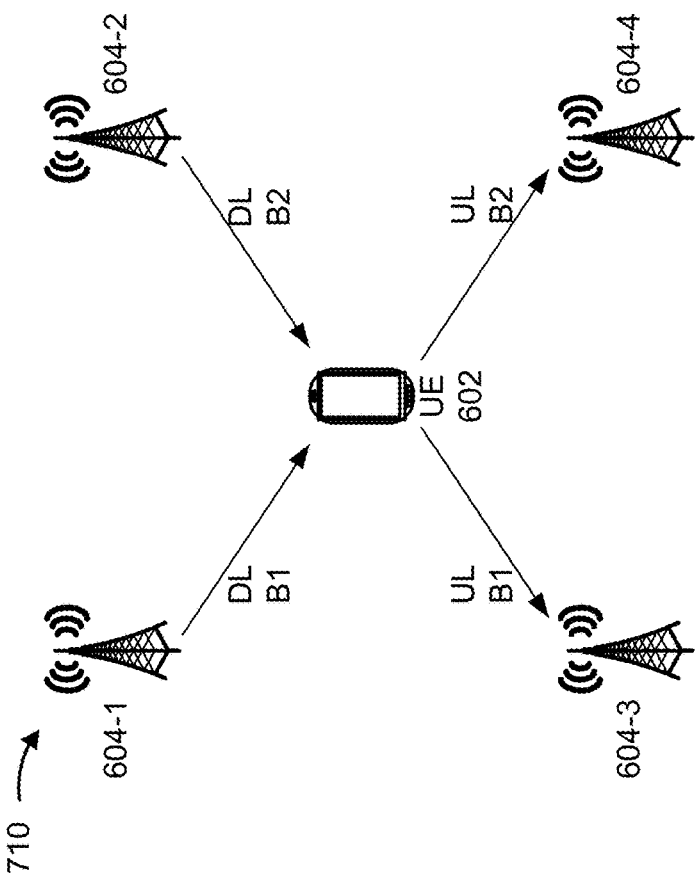
Figure 7A:
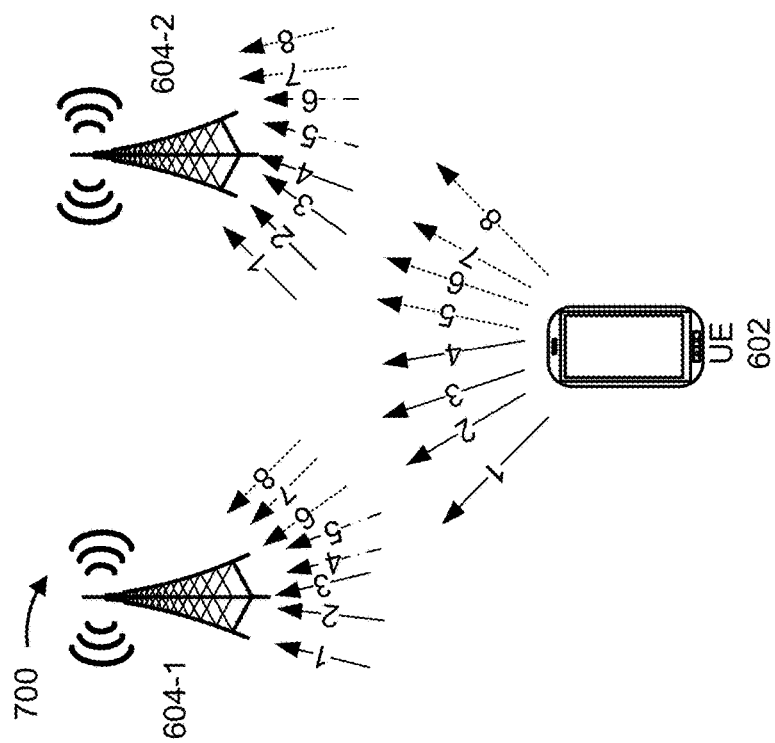

As shown in FIG. 7A, example 700 includes a UE 602 in communication with two base stations (or TRPs) 604-1 and 604-2. As shown in FIG. 7A, the UE 602 may be configured to use four beams (labeled 1, 2, 3, and 4 in FIG. 7A) with a first antenna panel and four beams (labeled 5, 6, 7, and 8 in FIG. 7A) with a second antenna panel. The UE 602 may select one or more of these beams for use in FD communications with the base stations 604-1 and 604-2 (e.g., as described above in connection with FIGS. 6A-6D). As further shown in FIG. 7A, the base station 604-1 may be configured to use three beams (labeled 1, 2, and 3 in FIG. 7A) with a first antenna panel, two beams (labeled 4 and 5 in FIG. 7A) with a second antenna panel, and three beams (labeled 6, 7, and 8 in FIG. 7A) with a third antenna panel. Similarly, the base station 604-2 may be configured to use four beams (labeled 1, 2, 3, and 4 in FIG. 7A) with a first antenna panel, two beams (labeled 5 and 6 in FIG. 7A) with a second antenna panel, and two beams (labeled 7 and 8 in FIG. 7A) with a third antenna panel. The base stations 604-1 and 604-2 may select from respective beams for use in FD communications with the UE 602 (e.g., as described above in connection with FIGS. 6A-6D).

As shown in FIG. 7B, example 710 includes a UE 602 in communication with four base stations (or TRPs) 604-1, 604-2, 604-3, and 604-4. As shown in FIG. 7B, the UE 602 may use a first beam (labeled B1 in FIG. 7B) to receive downlink transmissions from the base station 604-1 and to transmit uplink transmissions to the base station 604-3. Additionally, the UE 602 may use a second beam (labeled B2 in FIG. 7B) to receive downlink transmissions from the base station 604-2 and to transmit uplink transmissions to TRP 604-4. Accordingly, the UE 602 may support MIMO transmissions in a full duplex transmission mode. Thus, in example 710, full duplex communication is enabled for the UE 602, which may send uplink transmissions simultaneously with receiving downlink transmissions using different beams.

In some aspects, the UE 602 may be configured for simultaneous uplink and downlink communication with fewer base stations (or TRPs). For example, as shown in FIG. 7C, example 720 includes a UE 602 in communication with two base stations (or TRPs) 604-1 and 604-2. As shown in FIG. 7C, the UE 602 may use a first beam (labeled B1 in FIG. 7C) to receive downlink transmissions from and to transmit uplink transmissions to the base station 604-1. Additionally, the UE 602 may use a second beam (labeled B2 in FIG. 7C) to receive downlink transmissions from and to transmit uplink transmissions to the base station 604-2. Accordingly, in example 720, full duplex communication is enabled for the UE 602, which may send uplink transmissions simultaneously with receiving downlink transmissions using different beams. Another example 730 is shown in FIG. 7D. Example 730 includes a UE 602 in communication with two base stations (or TRPs) 604-1 and 604-2. As shown in FIG. 7D, the UE 602 may use a first beam (labeled B1 in FIG. 7D) to receive downlink transmissions from the base station 604-1 and to transmit uplink transmissions to the base station 604-2. Additionally, the UE 602 may use a second beam (labeled B2 in FIG. 7D) to receive downlink transmissions from the base station 604-1 and to transmit uplink transmissions to the base station 604-2. In some aspects, two co-located TRPs may be included in the base station 604-1 and two co-located TRPs may be included in the base station 604-2 in order to support Tx/Rx for the first beam and the second beam. Accordingly, in example 730, full duplex communication is also enabled for the UE 602, which may send uplink transmissions simultaneously with receiving downlink transmissions using different beams.

Figure 7E:
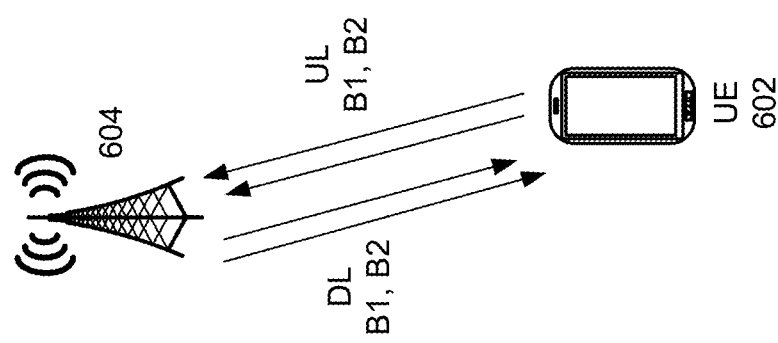

In some aspects, the UE 602 may be configured for simultaneous uplink and downlink communications with a single base station. For example, as shown in FIG. 7E, example 740 includes a UE 602 in communication with one base station (or TRP) 604. As shown in FIG. 7E, the UE 602 may use a first beam (labeled B1 in FIG. 7E) to receive downlink transmissions from and to transmit uplink transmissions to the base station 604. Additionally, the UE 602 may use a second beam (labeled B2 in FIG. 7E) to receive downlink transmissions from and to transmit uplink transmissions to TRP 604. In some aspects, two co-located TRPs may be included in the base station 604 in order to support Tx/Rx for the first beam and the second beam. Accordingly, in example 740, full duplex communication is enabled for the UE 602, which may send uplink transmissions simultaneously with receiving downlink transmissions using different beams.

As indicated above, FIGS. 7A-7E are provided as one or more examples. Other examples may differ from what is described with regard to FIGS. 7A-7E.

A base station (and/or first IAB node) may communicate with a UE (and/or second IAB node) using different quasi-co-location (QCL) relationships (e.g., different spatial parameters, different transmission configuration indicator (TCI) states, different precoding parameters, different beamforming parameters, and/or the like). For example, the different QCL relationships may be associated with different DMRS ports, different layers (e.g., of a multi-layer communication), and/or different panels (e.g., as described above with respect to FIG. 6D), among other examples. Accordingly, the base station may provide transmission configuration information (e.g., included in a TCI-State data structure as defined in 3GPP specifications and/or another standard) to the UE. For example, the base station may transmit DCI associated with the transmission configuration information. However, DCI typically includes only 3 bits in a field (e.g., a 'Transmission Configuration Indication' field as defined in 3GPP specifications and/or another standard) that indicate a single TCI state including the transmission configuration information. Moreover, a TCI state typically only includes QCL information for a single directionality, such as uplink or downlink.

Techniques and apparatuses described herein provide DCI that indicates TCI states, each TCI state including different transmission configuration information. Additionally, or alternatively, techniques and apparatuses described herein provide TCI states that include QCL information for multiple directions. Accordingly, techniques and apparatuses described herein may allow a UE (e.g., UE 120 and/or UE 602) to communicate simultaneously on an uplink to and a downlink from a base station (e.g., base station 110 and/or base station 604). Accordingly, the UE 602 and/or the base station 604 may operate in a full duplex mode (e.g., as described above in connection with FIGS. 6A-6D). As a result, the UE 602 and the base station 604 may experience increased speed and/or reduced latency on the network including the UE 602 and the base station 604 (e.g., wireless communication network 100, radio access network 305, radio access network 330, and/or radio access network 365).

FIG. 8 is a diagram illustrating an example 800 of generating and transmitting transmission configurations for full duplex transmissions, in accordance with the present disclosure. As shown in FIG. 8, a UE 602 may communicate with a base station 604. As described above with respect to FIGS. 6A-6D, the UE 602 may include a plurality of antenna panels for enabling full duplex communications with the base station 604. Similarly, as described above with respect to FIGS. 6A-6D, the base station 604 may include one or more TRPs configured for full duplex communications with the UE 602. Although the description below will focus on a base station, the description equally applies to TRPs, IAB parent nodes, and/or IAB child nodes.

As shown by reference number 805, the base station 604 may generate transmission configuration information, for full duplex transmissions, that includes a plurality of indicators of respective reference signals. For example, the full duplex transmissions may include an uplink and a downlink that overlap, at least partially, in frequency (e.g., a beam used for uplink and a beam used for downlink may have frequency ranges that at least partially overlap). In some aspects, the full duplex transmission may include an uplink and a downlink that fully overlap in frequency (e.g., a beam used for uplink and a beam used for downlink may share a frequency range and instead be orthogonal in a time domain). As an alternative, the full duplex transmission may include an uplink and a downlink that do not overlap in frequency (e.g., a beam used for uplink and a beam used for downlink may be orthogonal in a frequency domain).

In some aspects, the base station 604 may generate one or more data structures, to include the transmission configuration information, similar to a TCI-State data structure as defined by 3GPP specifications and/or another standard. In some aspects, the plurality of indicators may include QCL-Info indicators as defined by 3GPP specifications and/or another standard. Although the description below will focus on TCI-State data structures and QCL-Info indicators, the description similarly applies to other data structures and other indicators, respectively.

Accordingly, the one or more data structures may include the plurality of indicators (e.g., the QCL-Info indicators). In some aspects, each indicator of the plurality of indicators may be included in a different data structure. For example, the base station 604 may generate a plurality of TCI states, where each TCI state includes a different indicator of the plurality of indicators. As an alternative, a data structure may include two or more (or even all) of the plurality of indicators. For example, the base station 604 may generate a TCI state that includes two or more indicators of the plurality of indicators.

In some aspects, the respective reference signals may include channel state information reference signals (CSI-RSs). Additionally, or alternatively, the respective reference signals may be associated with different synchronization signal blocks (SSBs).

In some aspects, the plurality of indicators may include at least a first indicator associated with a first reference signal of the respective reference signals, and a second indicator associated with a second reference signal of the respective reference signals. For example, a first QCL-Info indicator may be associated with the first reference signal, and a second QCL-Info indicator may be associated with the second reference signal. In some aspects, the first reference signal may be associated with an uplink, and the second reference signal may be associated with a downlink. Accordingly, the base station 604 may generate the plurality of indicators to enable simultaneous transmission on the uplink and the downlink for the base station 604 and/or the UE 602.

In some aspects, the plurality of indicators may further include at least a third indicator associated with a third reference signal of the respective reference signals. For example, a third QCL-Info indicator may be associated with the third reference signal. In some aspects, the third reference signal may be associated with either the uplink or the downlink. For example, when the UE 602 and the base station 604 use two beams for downlink (e.g., as described above with respect to FIGS. 7A-7E), the base station 604 may include the third indicator, and the third reference signal may be associated with the downlink. Accordingly, in some aspects, the downlink may include at least two beams for the UE 602 to receive transmissions from at least two TRPs (e.g., TRPs 604-1 and 604-2) of the base station 604. In another example, when the UE 602 and the base station 604 use two beams for uplink (e.g., as described above with respect to FIGS. 7A-7E), the base station 604 may include the third indicator, and the third reference signal may be associated with the uplink. Accordingly, in some aspects, the uplink may include at least two beams for the UE 602 to transmit to at least two TRPs (e.g., TRPs 604-1 and 604-2) of the base station 604.

In some aspects, the UE 602 and the base station 604 may use two beams for downlink and two beams for uplink (e.g., as described above with respect to FIGS. 7A-7E) such that the base station 604 may include the third indicator as well as a fourth indicator associated with a fourth reference signal of the respective reference signals. For example, a fourth QCL-Info indicator may be associated with the fourth reference signal. In some aspects, the third reference signal may be associated with the downlink and the fourth reference signal may be associated with the uplink. Although the description herein focuses on up to four indicators associated with four respective reference signals, the description applies similarly to additional indicators based at least in part on a quantity of beams used for simultaneous transmission by the UE 602 and the base station 604.

In some aspects, as described above, at least one indicator of the plurality of indicators may be associated with an uplink. Accordingly, the transmission configuration information may include information indicating that the at least one indicator is associated with the uplink. For example, the at least on indicator may be included in an uplink TCI state or uplink spatial relation information. In some aspects, the base station 604 may generate a UL-TCI-State data structure to distinguish from a TCI-State data structure associated with a downlink and/or may generate a DL-TCI-State data structure to distinguish from a TCI-State data structure associated with an uplink. Additionally, or alternatively, the base station 604 may generate a UL-QCL-Info indicator to distinguish from a QCL-Info indicator associated with a downlink and/or may generate a DL-QCL-Info indicator to distinguish from a QCL-Info indicator associated with an uplink. Additionally, or alternatively, the base station 604 may generate a field or other information (e.g., within a TCI-State data structure and/or a QCL-Info indicator) that associates the at least one indicator of the plurality of indicators with the uplink and/or remaining indicators of the plurality of indicators with the downlink.

As shown by reference number 810, the base station 604 may transmit, and the UE 602 may receive, DCI associated with the transmission configuration information for full duplex transmissions. The DCI may indicate (e.g., in one or more fields, as described below) the transmission configuration information for full duplex transmissions. As described above in connection with reference number 805, the transmission configuration information includes a plurality of indicators of respective reference signals.

In some aspects, the DCI may include a field associated with a TCI state that includes the plurality of indicators. In some aspects, the field may be a codepoint or other identifier of the TCI state. For example, the DCI may include a 'Transmission Configuration Indication' field as defined in 3GPP specifications and/or another standard that indicates a data structure included in a tci-StatesToAddModList table (as defined in 3GPP specifications and/or another standard), a tci-StatesPDCCH-ToAddList table (as defined in 3GPP specifications and/or another standard), and/or another similar data structure (that may also be a portion of a table or larger data structure, or may be standalone). In some aspects, the TCI state may include the plurality of indicators (e.g., a plurality of QCL-Info indicators associated with respective reference signals).

Additionally, or alternatively, the DCI may include a plurality of fields. In some aspects, each field may be a codepoint or other identifier of a corresponding TCI state. For example, the plurality of fields may include at least a first field associated with a first TCI state that includes a first indicator of the plurality of indicators and a second field associated with a second TCI state that includes a second indicator of the plurality of indicators. In this example, each TCI state includes one of the plurality of indicators (e.g., one QCL-Info indicator associated with one of the respective reference signals).

As shown by reference number 815, the UE 602 may apply the transmission configuration information. In some aspects, the UE 602 may configure one or more hardware components of the UE 602 according to the transmission configuration information. For example, the UE 602 may configure one or more antenna panels based at least in part on the transmission configuration information (e.g., as described above in connection with FIG. 6D), configure one or more hardware components for forming particular beams based at least in part on the transmission configuration information (e.g., as described above in connection with FIG. 5), and/or otherwise instruct one or more components of a transmit chain and/or a receive chain based at least in part on the transmission configuration information.

In some aspects, the UE 602 may determine the transmission configuration information from a downlink channel configuration associated with the DCI. For example, the base station 604 may have provided the transmission configuration information associated with the DCI on the downlink channel configuration. In some aspects, the downlink channel may comprise a physical downlink control channel (PDCCH) or other downlink channel from the base station 604 to the UE 602. For example, the transmission configuration information may be included in a PDCCH-Config data structure as defined in 3GPP specifications and/or another standard.

As shown by reference number 820, the UE 602 and the base station 604 may communicate, based at least in part on the transmission configuration information. In some aspects, communicating with the base station 604 may include exchanging messages (e.g., control messages, data messages, and/or the like) and/or sequences (e.g., a peak-to-average-power ratio (PARP) sequences, hybrid automatic repeat request (HARQ) sequences, and/or the like) with the base station 604. For example, communicating with the base station 604 may include transmitting a message or a sequence to the base station 604 concurrent with receiving a message or a sequence from the base station 604. Accordingly, as described above, the communication shown by reference number 820 may include simultaneously transmitting and/or receiving using multiple panels of the UE 602 (e.g., as described above with respect to FIGS. 6A-6D).

In some aspects, and as described above with respect to FIGS. 7A-7E, the UE 602 and/or the base station 604 may further communicate using multiple beams. For example, as described above, a downlink from the base station 604 to the UE 602 may use at least two beams such that the base station 604 generates at least two indicators associated with the downlink. Additionally, or alternatively, as described above, an uplink to the base station 604 from the UE 602 may use at least two beams such that the base station 604 generates at least two indicators associated with the uplink.

By using DCI that includes a plurality of fields related to a plurality of TCI states and/or by generating TCI states that include a plurality of indicators, the base station 604 and the UE 602 may enable simultaneous transmission in multiple directions (e.g., on an uplink and on a downlink). As a result, the base station 604 and the UE 602 may communicate faster and/or with reduced latency. Moreover, the base station 604 and the UE 602 may further enable simultaneous transmission using multiple beams, as described above. As a result, the base station 604 and the UE 602 may further increase communication speeds and reduce latency.

As indicated above, FIG. 8 is provided as an example. Other examples may differ from what is described with regard to FIG. 8.

Figure 9:
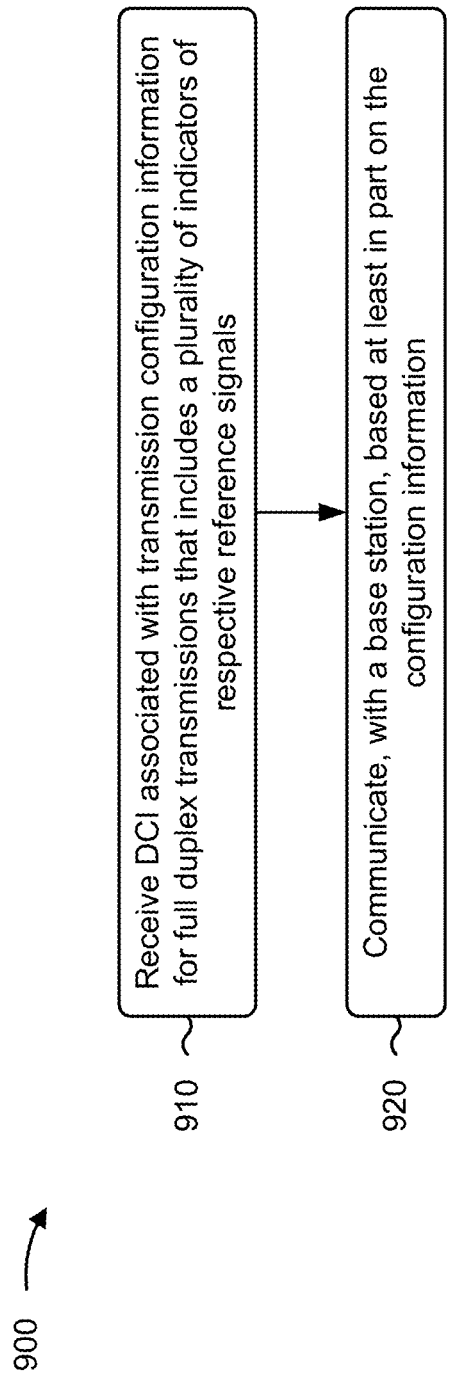
FIG. 9 is a diagram illustrating an example process performed by a UE, in accordance with the present disclosure.

FIG. 9 is a diagram illustrating an example process 900 performed, for example, by a UE, in accordance with the present disclosure. Example process 900 is an example where the UE (e.g., UE 120 and/or UE 602) performs operations associated with transmission configurations for full duplex transmissions.

As shown in FIG. 9, in some aspects, process 900 may include receiving, from a base station (e.g., base station 110 and/or base station 604), DCI associated with transmission configuration information for full duplex transmissions (block 910). For example, the UE (e.g., using one or more of antenna 252, demodulator 254, MIMO detector 256, receive processor 258, controller/processor 280, and/or memory 282) may receive, from the base station, the DCI associated with the transmission configuration information for full duplex transmissions, as described above. In some aspects, the transmission configuration information includes a plurality of indicators of respective reference signals.

As further shown in FIG. 9, in some aspects, process 900 may include communicating, with the base station, based at least in part on the transmission configuration information (block 920). For example, the UE (e.g., using one or more of antenna 252, demodulator 254, MIMO detector 256, receive processor 258, transmit processor 264, TX MIMO processor 266, modulator 254, controller/processor 280, and/or memory 282) may communicate, with the base station, based at least in part on the transmission configuration information, as described above.

Process 900 may include additional aspects, such as any single aspect or any combination of aspects described below and/or in connection with one or more other processes described elsewhere herein.

In a first aspect, process 900 further includes determining (e.g., using one or more of receive processor 258, transmit processor 264, controller/processor 280, and/or memory 282) the transmission configuration information from a downlink channel configuration associated with the DCI.

In a second aspect, alone or in combination with the first aspect, the DCI includes a field associated with a TCI state that includes the plurality of indicators.

In a third aspect, alone or in combination with one or more of the first and second aspects, the plurality of indicators include at least a first indicator associated with a first reference signal of the respective reference signals, and a second indicator associated with a second reference signal of the respective reference signals, wherein the first reference signal is associated with an uplink, and the second reference signal is associated with a downlink.

In a fourth aspect, alone or in combination with one or more of the first through third aspects, the plurality of indicators further include at least a third indicator associated with a third reference signal of the respective reference signals, wherein the third reference signal is associated with the uplink or associated with the downlink.

In a fifth aspect, alone or in combination with one or more of the first through fourth aspects, the third reference signal is associated with the uplink, and the uplink includes at least two beams for transmitting to at least two transmit-receive points of the base station.

In a sixth aspect, alone or in combination with one or more of the first through fifth aspects, the third reference signal is associated with the downlink, and the downlink includes at least two beams for receiving transmissions from at least two transmit-receive points of the base station.

In a seventh aspect, alone or in combination with one or more of the first through sixth aspects, the DCI includes a plurality of fields, wherein the plurality of fields include at least a first field associated with a first TCI state that includes a first indicator of the plurality of indicators and a second field associated with a second TCI state that includes a second indicator of the plurality of indicators.

In an eighth aspect, alone or in combination with one or more of the first through seventh aspects, at least one indicator of the plurality of indicators is associated with an uplink, and the transmission configuration information includes information indicating that the at least one indicator is associated with the uplink.

In a ninth aspect, alone or in combination with one or more of the first through eighth aspects, communicating with the base station includes transmitting (e.g., using one or more of antenna 252, transmit processor 264, TX MIMO processor 266, modulator 254, controller/processor 280, and/or memory 282) a message or a sequence to the base station concurrent with receiving (e.g., using one or more of antenna 252, demodulator 254, MIMO detector 256, receive processor 258, controller/processor 280, and/or memory 282) a message or a sequence from the base station.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
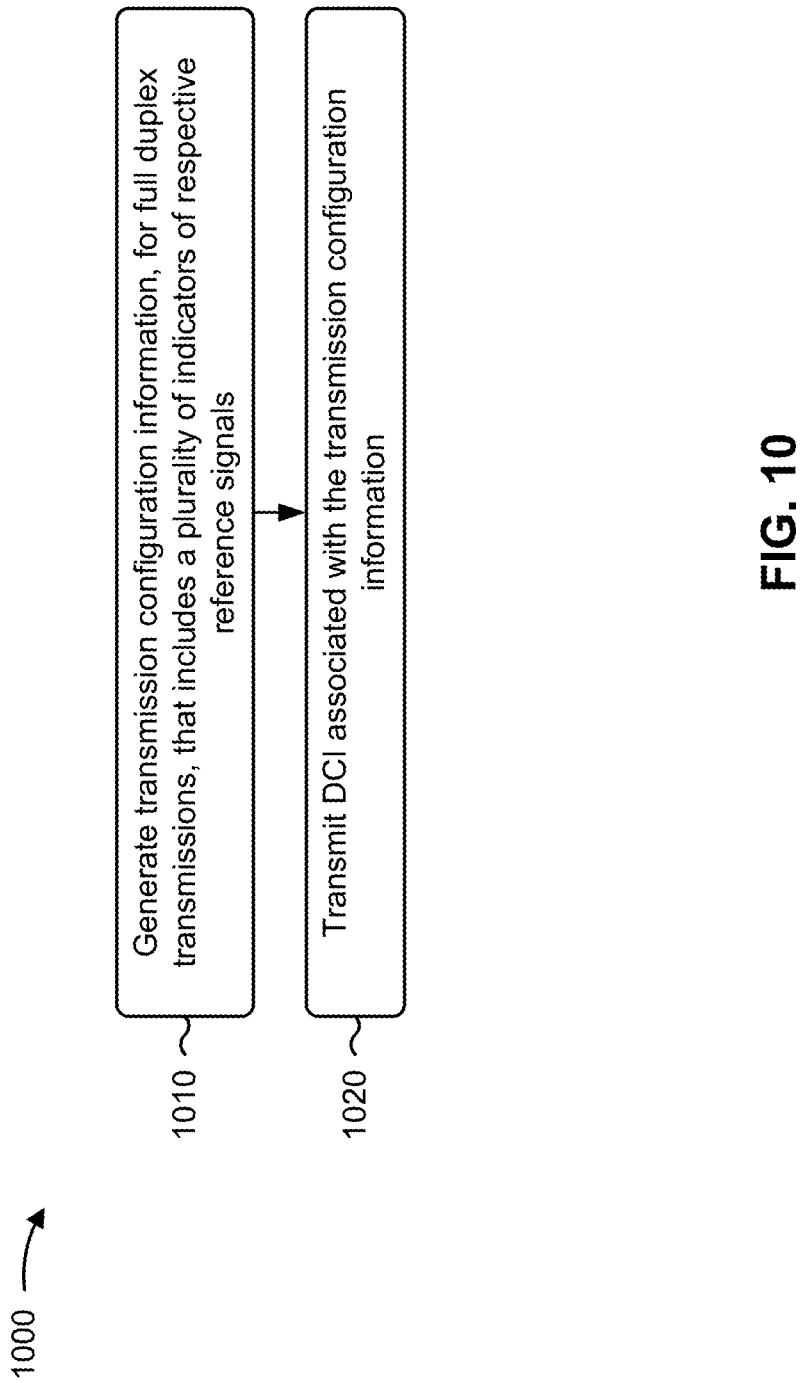
FIG. 10 is a diagram illustrating an example process performed by a base station, in accordance with the present disclosure.

FIG. 10 is a diagram illustrating an example process 1000 performed, for example, by a base station, in accordance with the present disclosure. Example process 1000 is an example where the base station (e.g., base station 110 and/or base station 604) performs operations associated with transmission configurations for full duplex transmissions.

As shown in FIG. 10, in some aspects, process 1000 may include generating transmission configuration information, for full duplex transmissions, that includes a plurality of indicators of respective reference signals (block 1010). For example, the base station (e.g., using one or more of transmit processor 220, TX MIMO processor 230, MIMO detector 236, receive processor 238, controller/processor 240, memory 242, and/or scheduler 246) may generate the transmission configuration information, for full duplex transmissions, that includes the plurality of indicators of the respective reference signals, as described above.

As further shown in FIG. 10, in some aspects, process 1000 may include transmitting, to a UE (e.g., UE 120 and/or UE 602), DCI associated with the transmission configuration information (block 1020). For example, the base station (e.g., using one or more of transmit processor 220, TX MIMO processor 230, modulator 232, antenna 234, controller/processor 240, memory 242, and/or scheduler 246) may transmit, to the UE, the DCI associated with the transmission configuration information, as described above.

Process 1000 may include additional aspects, such as any single aspect or any combination of aspects described below and/or in connection with one or more other processes described elsewhere herein.

In a first aspect, process 1000 further includes providing (e.g., using one or more of transmit processor 220, TX MIMO processor 230, modulator 232, antenna 234, controller/processor 240, memory 242, and/or scheduler 246) the transmission configuration information associated with the DCI on a downlink channel configuration.

In a second aspect, alone or in combination with the first aspect, the DCI includes a field associated with a configuration data structure that includes the plurality of indicators.

In a third aspect, alone or in combination with one or more of the first and second aspects, the plurality of indicators include at least a first indicator associated with a first reference signal of the respective reference signals, and a second indicator associated with a second reference signal of the respective reference signals, wherein the first reference signal is associated with an uplink, and the second reference signal is associated with a downlink.

In a fourth aspect, alone or in combination with one or more of the first through third aspects, the plurality of indicators further include at least a third indicator associated with a third reference signal of the respective reference signals, wherein the third reference signal is associated with the uplink or the downlink.

In a fifth aspect, alone or in combination with one or more of the first through fourth aspects, the third reference signal is associated with the uplink, and the uplink includes at least two beams for receiving from the UE using at least two transmit-receive points of the base station.

In a sixth aspect, alone or in combination with one or more of the first through fifth aspects, the third reference signal is associated with the downlink, and the downlink includes at least two beams for transmitting to the UE using at least two transmit-receive points of the base station.

In a seventh aspect, alone or in combination with one or more of the first through sixth aspects, the DCI includes a plurality of fields, wherein the plurality of fields include at least a first field associated with a first configuration data structure that includes a first indicator of the plurality of indicators, and a second field associated with a second configuration data structure that includes a second indicator of the plurality of indicators.

In an eighth aspect, alone or in combination with one or more of the first through seventh aspects, at least one indicator of the plurality of indicators is associated with an uplink, and the transmission configuration information includes information indicating that the at least one indicator is associated with the uplink.

In a ninth aspect, alone or in combination with one or more of the first through eighth aspects, process 1000 further includes communicating, with the UE, based at least in part on the transmission configuration information, wherein the communicating includes transmitting (e.g., using one or more of transmit processor 220, TX MIMO processor 230, modulator 232, antenna 234, controller/processor 240, memory 242, and/or scheduler 246) a message or a sequence to the UE concurrent with receiving (e.g., using one or more of antenna 234, demodulator 232, MIMO detector 236, receive processor 238, controller/processor 240, memory 242, and/or scheduler 246) a message or a sequence from the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment (UE), comprising: receiving, from a base station, downlink control information (DCI) associated with transmission configuration information for full duplex transmissions, wherein the transmission configuration information includes a plurality of indicators of respective reference signals; and communicating, with the base station, based at least in part on the transmission configuration information.

Aspect 2: The method of Aspect 1, wherein the full duplex transmissions include an uplink and a downlink that overlap, at least partially, in frequency.

Aspect 3: The method of Aspect 1, wherein the full duplex transmissions include an uplink and a downlink that fully overlap in frequency.

Aspect 4: The method of Aspect 1, wherein the full duplex transmissions include an uplink and a downlink that do not overlap in frequency.

Aspect 5: The method of any one of Aspects 1 through 4, further comprising: determining the transmission configuration information from a downlink channel configuration associated with the DCI.

Aspect 6: The method of any one of Aspects 1 through 5, wherein the DCI includes a field associated with a transmission configuration indicator (TCI) state that includes the plurality of indicators.

Aspect 7: The method of any one of Aspects 1 through 6, wherein the plurality of indicators include at least a first indicator associated with a first reference signal of the respective reference signals, and a second indicator associated with a second reference signal of the respective reference signals, wherein the first reference signal is associated with an uplink, and the second reference signal is associated with a downlink.

Aspect 8: The method of Aspect 7, wherein the plurality of indicators further include at least a third indicator associated with a third reference signal of the respective reference signals, wherein the third reference signal is associated with the uplink or associated with the downlink.

Aspect 9: The method of Aspect 8, wherein the third reference signal is associated with the uplink, and wherein the uplink includes at least two beams for transmitting to at least two transmit-receive points of the base station.

Aspect 10: The method of Aspect 8, wherein the third reference signal is associated with the downlink, and wherein the downlink includes at least two beams for receiving transmissions from at least two transmit-receive points of the base station.

Aspect 11: The method of any one of Aspects 1 through 5, wherein the DCI includes a plurality of fields, wherein the plurality of fields include at least a first field associated with a first transmission configuration indicator (TCI) state that includes a first indicator of the plurality of indicators and a second field associated with a second TCI state that includes a second indicator of the plurality of indicators.

Aspect 12: The method of Aspect 11, wherein the first indicator is associated with a first reference signal of the respective reference signals, and the second indicator is associated with a second reference signal of the respective reference signals, wherein the first reference signal is associated with an uplink, and the second reference signal is associated with a downlink.

Aspect 13: The method of Aspect 12, wherein the plurality of indicators further include at least a third indicator associated with a third reference signal of the respective reference signals, wherein the third reference signal is associated with the uplink or the downlink.

Aspect 14: The method of Aspect 13, wherein the third reference signal is associated with the uplink, and wherein the uplink includes at least two beams for transmitting to at least two transmit-receive points of the base station.

Aspect 15: The method of Aspect 13, wherein the third reference signal is associated with the downlink, and wherein the downlink includes at least two beams for receiving transmissions from at least two transmit-receive points of the base station.

Aspect 16: The method of any one Aspects 1 through 15, wherein at least one indicator of the plurality of indicators is associated with an uplink, and the transmission configuration information is indicated using an uplink transmission configuration indicator (TCI) state or uplink spatial relation information.

Aspect 17: The method of any one of Aspects 1 through 16, wherein communicating with the base station includes transmitting a message or a sequence to the base station concurrent with receiving a message or a sequence from the base station.

Aspect 18: A method of wireless communication performed by a base station, comprising: generating transmission configuration information, for full duplex transmissions, that includes a plurality of indicators of respective reference signals; and transmitting, to a UE, downlink control information (DCI) associated with the transmission configuration information.

Aspect 19: The method of Aspect 18, wherein the full duplex transmissions include an uplink and a downlink that overlap, at least partially, in frequency.

Aspect 20: The method of Aspect 18, wherein the full duplex transmissions include an uplink and a downlink that fully overlap in frequency.

Aspect 21: The method of Aspect 18, wherein the full duplex transmissions include an uplink and a downlink that do not overlap in frequency.

Aspect 22: The method of any one of Aspects 18 through 21, further comprising: providing the transmission configuration information associated with the DCI on a downlink channel configuration.

Aspect 23: The method of any one of Aspects 18 through 22, wherein the DCI includes a field associated with a transmission configuration indicator (TCI) state that includes the plurality of indicators.

Aspect 24: The method of any one of Aspects 18 through 23, wherein the plurality of indicators include at least a first indicator associated with a first reference signal of the respective reference signals, and a second indicator associated with a second reference signal of the respective reference signals, wherein the first reference signal is associated with an uplink, and the second reference signal is associated with a downlink.

Aspect 25: The method of Aspect 24, wherein the plurality of indicators further include at least a third indicator associated with a third reference signal of the respective reference signals, wherein the third reference signal is associated with the uplink or the downlink.

Aspect 26: The method of Aspect 25, wherein the third reference signal is associated with the uplink, and wherein the uplink includes at least two beams for receiving from the UE using at least two transmit-receive points of the base station.

Aspect 27: The method of Aspect 25, wherein the third reference signal is associated with the downlink, and wherein the downlink includes at least two beams for transmitting to the UE using at least two transmit-receive points of the base station.

Aspect 28: The method of any one of Aspects 18 through 22, wherein the DCI includes a plurality of fields, wherein the plurality of fields include at least a first field associated with a first transmission configuration indicator (TCI) state that includes a first indicator of the plurality of indicators, and a second field associated with a second TCI state that includes a second indicator of the plurality of indicators.

Aspect 29: The method of Aspect 28, wherein the first indicator is associated with a first reference signal of the respective reference signals, and the second indicator is associated with a second reference signal of the respective reference signals, wherein the first reference signal is associated with an uplink, and the second reference signal is associated with a downlink.

Aspect 30: The method of Aspect 29, wherein the plurality of indicators further include at least a third indicator associated with a third reference signal of the respective reference signals, wherein the third reference signal is associated with the uplink or the downlink.

Aspect 31: The method of Aspect 30, wherein the third reference signal is associated with the uplink, and wherein the uplink includes at least two beams for receiving from the UE using at least two transmit-receive points of the base station.

Aspect 32: The method of Aspect 30, wherein the third reference signal is associated with the downlink, and wherein the downlink includes at least two beams for transmitting to the UE using at least two transmit-receive points of the base station.

Aspect 33: The method of any one of Aspects 18 through 32, wherein at least one indicator of the plurality of indicators is associated with an uplink, and the transmission configuration information is indicated using an uplink transmission configuration indicator (TCI) state or uplink spatial relation information.

Aspect 34: The method of any one of Aspects 18 through 33, further comprising: communicating, with the UE, based at least in part on the transmission configuration information, wherein the communicating includes transmitting a message or a sequence to the UE concurrent with receiving a message or a sequence from the UE.

Aspect 33: An apparatus for wireless communication at a device, comprising a processor; memory coupled with the processor; and instructions stored in the memory and executable by the processor to cause the apparatus to perform the method of one or more Aspects of Aspects 1-17.

Aspect 34: A device for wireless communication, comprising a memory and one or more processors coupled to the memory, the memory and the one or more processors configured to perform the method of one or more Aspects of Aspects 1-17.

Aspect 35: An apparatus for wireless communication, comprising at least one means for performing the method of one or more Aspects of Aspects 1-17.

Aspect 36: A non-transitory computer-readable medium storing code for wireless communication, the code comprising instructions executable by a processor to perform the method of one or more Aspects of Aspects 1-17.

Aspect 37: A non-transitory computer-readable medium storing a set of instructions for wireless communication, the set of instructions comprising one or more instructions that, when executed by one or more processors of a device, cause the device to perform the method of one or more Aspects of Aspects 1-17.

Aspect 38: An apparatus for wireless communication at a device, comprising a processor; memory coupled with the processor; and instructions stored in the memory and executable by the processor to cause the apparatus to perform the method of one or more Aspects of Aspects 18-34.

Aspect 39: A device for wireless communication, comprising a memory and one or more processors coupled to the memory, the memory and the one or more processors configured to perform the method of one or more Aspects of Aspects 18-34.

Aspect 40: An apparatus for wireless communication, comprising at least one means for performing the method of one or more Aspects of Aspects 18-34.

Aspect 41: A non-transitory computer-readable medium storing code for wireless communication, the code comprising instructions executable by a processor to perform the method of one or more Aspects of Aspects 18-34.

Aspect 42: A non-transitory computer-readable medium storing a set of instructions for wireless communication, the set of instructions comprising one or more instructions that, when executed by one or more processors of a device, cause the device to perform the method of one or more Aspects of Aspects 18-34.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled to the memory, the one or more processors configured to:
receive, from a base station, downlink control information (DCI) associated with transmission configuration information for full duplex transmissions, the transmission configuration information including a plurality of indicators of respective reference signals; and
communicate, with the base station, in accordance with the transmission configuration information.

2. The UE of claim 1, wherein
the transmission configuration information is associated with a downlink channel configuration associated with the DCI.

3. The UE of claim 1, wherein the DCI includes a field associated with a transmission configuration indictor (TCI) state that includes the plurality of indicators.

4. The UE of claim 1, wherein the plurality of indicators includes at least a first indicator associated with a first reference signal of the respective reference signals, and a second indicator associated with a second reference signal of the respective reference signals, the first reference signal being associated with an uplink, and the second reference signal being associated with a downlink.

5. The UE of claim 4, wherein the plurality of indicators further includes at least a third indicator associated with a third reference signal of the respective reference signals, the third reference signal being associated with the uplink or associated with the downlink.

6. The UE of claim 5, wherein the third reference signal is associated with the uplink, and the uplink including at least two beams for transmitting to at least two transmit-receive points of the base station.

7. The UE of claim 5, wherein the third reference signal is associated with the downlink, and the downlink including at least two beams for receiving transmissions from at least two transmit-receive points of the base station.

8. The UE of claim 4, wherein the DCI includes a plurality of fields, the plurality of fields including at least a first field associated with a first transmission configuration indictor (TCI) state that includes the first indicator of the plurality of indicators and a second field associated with a second TCI state that includes the second indicator of the plurality of indicators.

9. The UE of claim 8, wherein the plurality of indicators further includes at least a third indicator associated with a third reference signal of the respective reference signals, the third reference signal being associated with the uplink or the downlink.

10. The UE of claim 9, wherein the third reference signal is associated with the uplink, and the uplink including at least two beams for transmitting to at least two transmit-receive points of the base station.

11. The UE of claim 9, wherein the third reference signal is associated with the downlink, and the downlink including at least two beams for receiving transmissions from at least two transmit-receive points of the base station.

12. The UE of claim 1, wherein at least one indicator of the plurality of indicators is associated with an uplink, and the transmission configuration information is indicated using an uplink transmission configuration indicator (TCI) state or uplink spatial relation information.

13. The UE of claim 1, wherein communicating with the base station includes transmitting a message or a sequence to the base station concurrent with receiving a message or a sequence from the base station.

14. A base station for wireless communication, comprising:
a memory; and
one or more processors coupled to the memory, the one or more processors configured to:
generate transmission configuration information, for full duplex transmissions, that includes a plurality of indicators of respective reference signals; and
transmit, to a user equipment (UE), downlink control information (DCI) associated with the transmission configuration information.

15. The base station of claim 14, wherein the full duplex transmissions include an uplink and a downlink that overlap, at least partially, in frequency.

16. The base station of claim 14, wherein the full duplex transmissions include an uplink and a downlink that fully overlap in frequency.

17. The base station of claim 14, wherein the full duplex transmissions include an uplink and a downlink that do not overlap in frequency.

18. The base station of claim 14, wherein the memory and the one or more processors are further configured to:
provide the transmission configuration information associated with the DCI on a downlink channel configuration.

19. The base station of claim 14, wherein the DCI includes a field associated with a transmission configuration indicator (TCI) state that includes the plurality of indicators.

20. The base station of claim 14, wherein the plurality of indicators includes at least a first indicator associated with a first reference signal of the respective reference signals, and a second indicator associated with a second reference signal of the respective reference signals, the first reference signal being associated with an uplink, and the second reference signal being associated with a downlink.

21. The base station of claim 20, wherein the plurality of indicators further includes at least a third indicator associated with a third reference signal of the respective reference signals, the third reference signal being associated with the uplink or the downlink.

22. The base station of claim 21, wherein the third reference signal is associated with the uplink, and the uplink including at least two beams for receiving from the UE using at least two transmit-receive points of the base station.

23. The base station of claim 21, wherein the third reference signal is associated with the downlink, and the downlink including at least two beams for transmitting to the UE using at least two transmit-receive points of the base station.

24. The base station of claim 20, wherein the DCI includes a plurality of fields, the plurality of fields including at least a first field associated with a first transmission configuration indicator (TCI) state that includes the first indicator of the plurality of indicators, and a second field associated with a second TCI state that includes the second indicator of the plurality of indicators.

25. The base station of claim 14, wherein at least one indicator of the plurality of indicators is associated with an uplink, and the transmission configuration information is indicated using an uplink transmission configuration indicator (TCI) state or uplink spatial relation information.

26. The base station of claim 14, wherein the one or more processors are further configured to:
communicate, with the UE, in accordance with the transmission configuration information, the communicating including transmitting a message or a sequence to the UE concurrent with receiving a message or a sequence from the UE.

27. A method of wireless communication performed by a user equipment (UE), comprising:
receiving, from a base station, downlink control information (DCI) associated with transmission configuration information for full duplex transmissions, the transmission configuration information including a plurality of indicators of respective reference signals; and
communicating, with the base station, in accordance with the transmission configuration information.

28. The method of claim 27, wherein the DCI includes a field associated with a transmission configuration indicator (TCI) state that includes the plurality of indicators.

29. The method of claim 27, wherein the DCI includes a plurality of fields, the plurality of fields including at least a first field associated with a first transmission configuration indicator (TCI) state that includes a first indicator of the plurality of indicators and a second field associated with a second TCI state that includes a second indicator of the plurality of indicators.

30. A method of wireless communication performed by a base station, comprising:
generating transmission configuration information, for full duplex transmissions, that includes a plurality of indicators of respective reference signals; and
transmitting, to a user equipment (UE), downlink control information (DCI) associated with the transmission configuration information.

* * * * *